US005505493A

United States Patent [19]
Camfield et al.

[11] Patent Number: 5,505,493
[45] Date of Patent: Apr. 9, 1996

[54] BICYCLE WITH SIMULATED MOTORCYCLE PARTS

[75] Inventors: David K. Camfield; Daniel G. Hahn; Duane Niemeyer; Daniel F. Brashear, all of Olney; Ricke D. Shamhart, Wheeler, all of Ill.

[73] Assignee: Roadmaster Corporation, Olney, Ill.

[21] Appl. No.: 314,607

[22] Filed: Sep. 28, 1994

Related U.S. Application Data

[63] Continuation-in-part of Ser. No. 248,806, May 24, 1994, abandoned, which is a continuation-in-part of Ser. No. 896,155, Jun. 10, 1992, Pat. No. 5,314,207.

[51] Int. Cl.$^6$ .................................................. B62J 17/00
[52] U.S. Cl. ..................... 280/828; 280/272; 280/288.4; 446/404; 296/78.1; D12/111; D12/126
[58] Field of Search ..................... 280/827, 828, 280/272, 288.4, 304.3, 288.2; 446/440, 470, 404; 296/177, 78.1; D12/111, 110, 126, 127

[56] References Cited

U.S. PATENT DOCUMENTS

| D. 138,304 | 7/1944 | Boyntom | D2/892 |
| D. 149,408 | 4/1948 | Fuhs | D12/108 |
| D. 149,968 | 6/1948 | Oertle | D12/110 |

(List continued on next page.)

FOREIGN PATENT DOCUMENTS 2213786  8/1989  United Kingdom.

OTHER PUBLICATIONS

U.S. Trademark Registration No. 74/467,938.
U.S. Trademark Registration No. 74/467,939.
U.S. Trademark Registration No. 74/467,941.
Brochure entitled "Bicycle for 1975", 2 pages.
AMF Junior Catalog, 1978 Juvenile Wheel Goods, pp. 10 and 12.
AMF Catalog, Junior Wheel Goods for 1979, p. 9.
Hedstrom 1985 Catalog, pp. 4–9.
Brochure, Rand International "Barbie for Girls", 4 pages.
FAO Schwarz, "The Ultimate Toy Catalogue Fall 1993", 4 pages.
Brochure, Roadmaster, "1993 Pedacycles", 3 pages.
Famosa Catalog, 16 pages (undated) (circa 1993).
Roadmaster Corporation, "1993 Bicycle Products", Motocykes Models 7299, 7699 and 2999.
Article from USA Today Newspaper entitled "Toys for Little Angels or Kids Born to be Wild", one page, Feb. 11, 1994.
Brochure, Popular Club Plan® Holiday Wishes, 1994, 2 pages.
Huffy Catalog, circa 1994, pp. 26, 27.
Brochure entitled "Roadmaster Introduces the Harley–Davidson® of Bicycles", 6 pages 1994 by Roadmaster Corporation.
Roadmaster Corporation Catalog, 1995 Bicycle Catalog, Motocykes Models R1399, R7799A and R7399A.
Advertisement for Dynamic Bicycles from a Mexican Cycling Magazine.
Catalog, AMF, Evel Knievel Line, Spirited New Evel Knievel Styles for 1976 (See models L–9240, E–992, E–966), Dec. 1976.
Catalog, AMF, Junior, 1977 Juvenile Wheel Goods, (See model E–986), Dec. 1976.

*Primary Examiner*—Kevin T. Hurley
*Attorney, Agent, or Firm*—Willian Brinks Hofer Gilson & Lione; Steven P. Shurtz

[57] ABSTRACT

A bicycle with simulated motorcycle parts includes a shroud attachable to the bicycle. The shroud has a center portion simulating a gas tank and a rear fender portion extending over the rear wheel. The shroud is configured to fit around the seat tube of the bicycle and preferably covers the top tube of the bicycle. In one embodiment, a fairing mounted in front of the handlebars simulates a fairing on a motorcycle. In another embodiment, chrome plated plastic parts are used to simulate a motorcycle engine and a sound system is included that replicates the sound of a motorcycle.

27 Claims, 25 Drawing Sheets

U.S. PATENT DOCUMENTS

| | | | |
|---|---|---|---|
| D. 166,693 | 5/1952 | Lines | D12/111 X |
| D. 170,610 | 10/1953 | Sebel | D12/111 X |
| D. 200,753 | 3/1965 | Ryan | D12/111 |
| D. 203,146 | 12/1965 | Ryan | D12/111 |
| D. 237,701 | 11/1975 | Vachon | D12/111 |
| D. 240,418 | 7/1978 | Hammatsu et al. | D12/111 |
| D. 241,330 | 9/1976 | Morioka et al. | D12/110 |
| D. 243,754 | 3/1977 | Silva | D12/111 |
| D. 245,002 | 7/1977 | Carpenter et al. | D12/111 |
| D. 245,770 | 9/1977 | Brightbill | D12/126 |
| D. 246,170 | 10/1977 | Powers | D12/111 |
| D. 246,779 | 12/1977 | Cognata | D12/126 |
| D. 250,329 | 11/1978 | Breen | D12/126 |
| D. 267,245 | 12/1982 | Iwasaki | D12/110 |
| D. 273,100 | 3/1984 | Ziegler | D12/111 |
| D. 274,611 | 7/1984 | Kawagoe et al. | D12/110 |
| D. 291,187 | 8/1987 | Smith et al. | D12/111 |
| D. 291,291 | 8/1987 | Voytko et al. | D12/111 |
| D. 291,292 | 8/1987 | Smith et al. | D12/111 |
| D. 294,338 | 2/1988 | Yamada et al. | D12/111 X |
| D. 297,721 | 9/1988 | Kaneko et al. | D12/110 |
| D. 302,801 | 8/1989 | Lacroix | D12/110 |
| D. 326,247 | 5/1992 | Hess | D12/111 |
| D. 342,702 | 12/1993 | Camfield et al. | D12/111 |
| D. 343,599 | 1/1994 | Camfield et al. | D12/111 |
| D. 343,810 | 2/1994 | Sanborn | D12/111 |
| D. 345,325 | 3/1994 | Camfield et al. | D12/111 X |
| D. 346,138 | 4/1994 | Camfield et al. | D12/111 |
| D. 350,087 | 8/1994 | Sanborn | D12/111 |
| 1,498,677 | 6/1924 | Bemis et al. | 280/87.021 |
| 2,126,752 | 8/1938 | Devine et al. | 280/304.3 |
| 2,513,496 | 7/1950 | Kranz | 280/304.3 |
| 2,575,292 | 11/1951 | Persons | 280/304.3 |
| 2,620,764 | 12/1952 | Cook | 446/404 X |
| 3,875,969 | 4/1975 | Howland | 446/404 |
| 4,006,915 | 2/1977 | Parker | 280/271 |
| 4,022,487 | 5/1977 | Leahy | 296/78.1 |
| 4,055,914 | 11/1977 | Ieda et al. | 446/404 X |
| 4,445,704 | 5/1984 | Troxler | 280/272 X |
| 4,575,189 | 3/1986 | Johnson | 280/288.4 X |
| 4,735,592 | 4/1988 | Griffin | 280/828 X |
| 4,739,851 | 4/1988 | Perego | 180/65.1 |
| 4,887,827 | 12/1989 | Heggie | 280/272 |
| 5,041,043 | 8/1991 | Hoke | 280/828 X |
| 5,267,767 | 12/1993 | Farrow | 280/288.2 X |
| 5,314,207 | 5/1994 | Camfield et al. | 280/828 |
| 5,314,372 | 5/1994 | Kramer | 180/221 X |

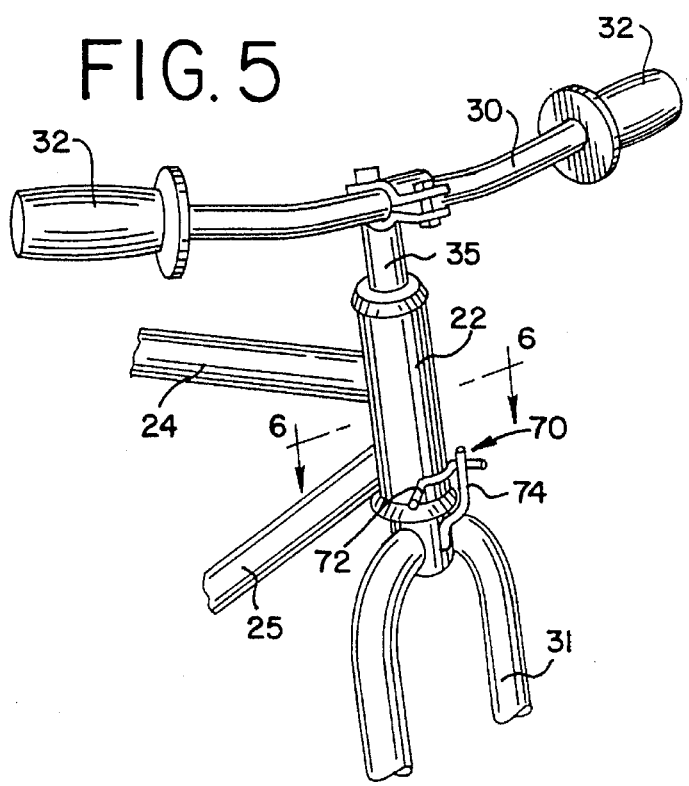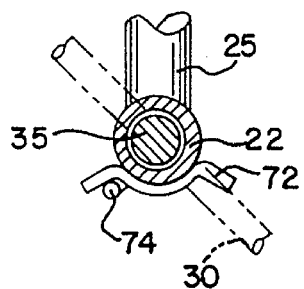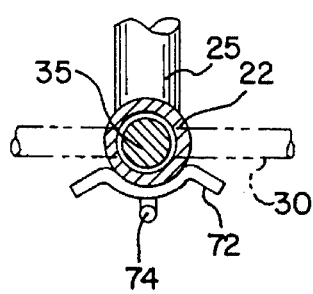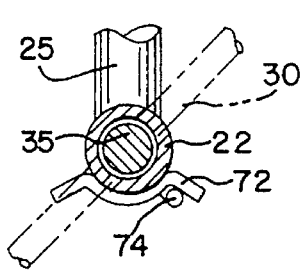

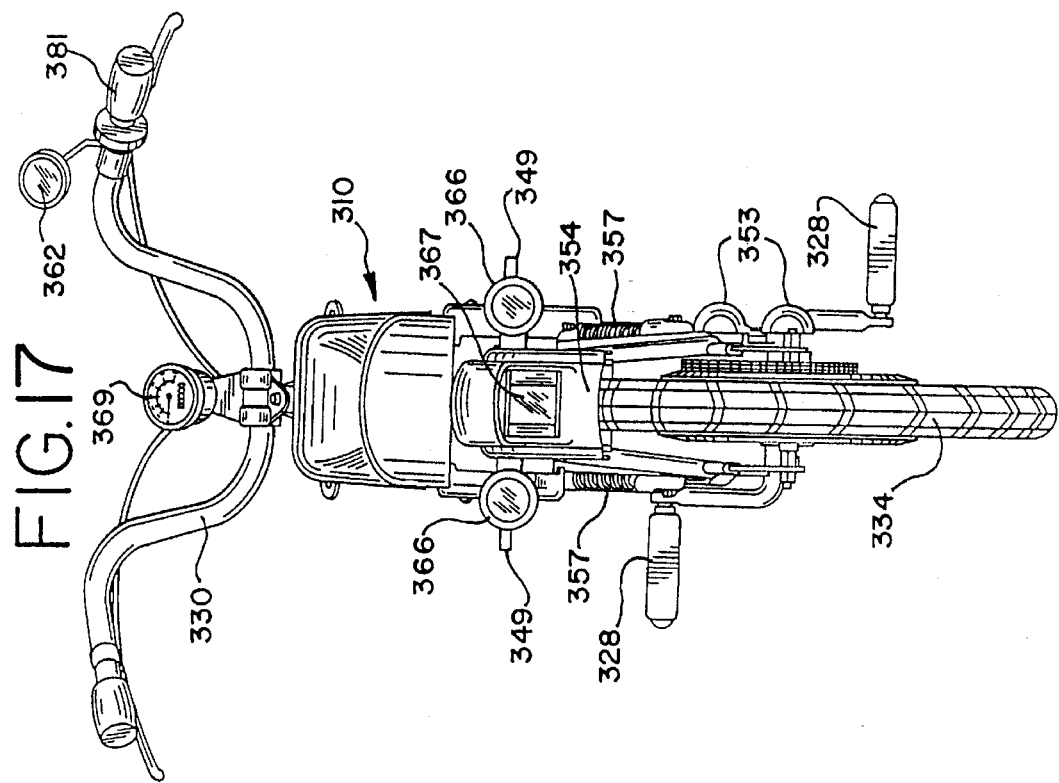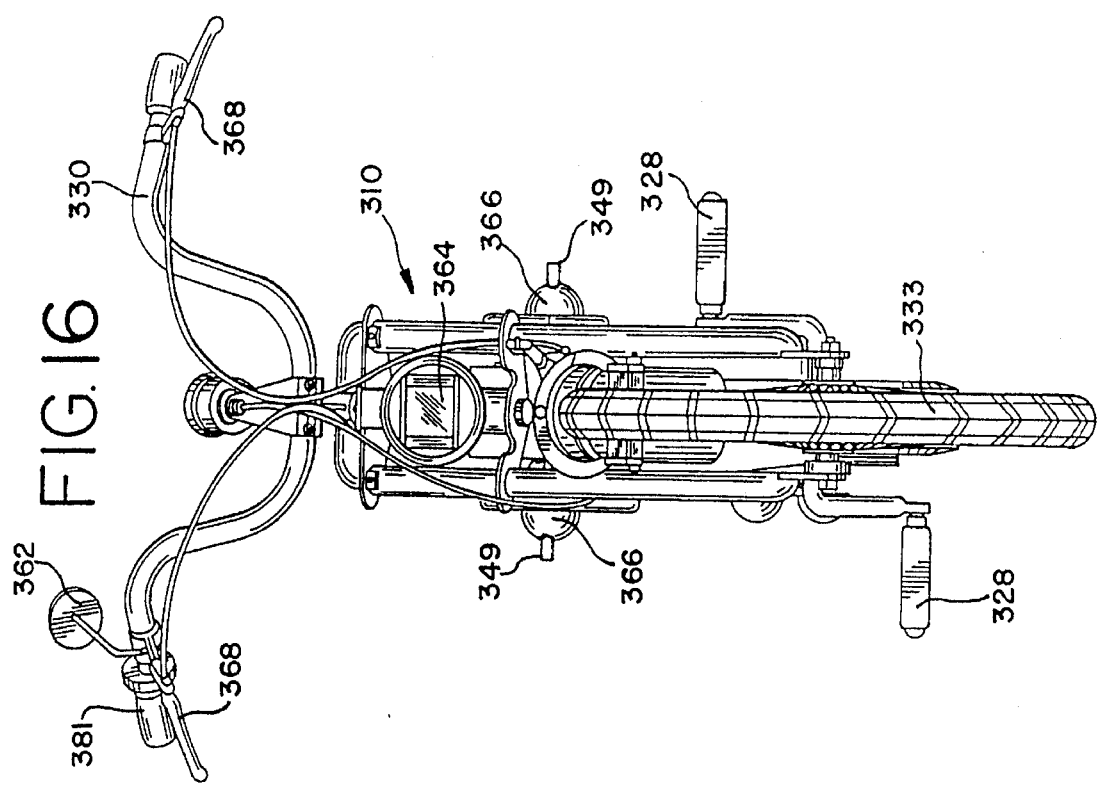

BICYCLE WITH SIMULATED MOTORCYCLE PARTS

CROSS-REFERENCE TO RELATED APPLICATIONS

This application is a continuation-in-part of U.S. Application Ser. No. 08/248,806, filed May 24, 1994, abandoned, which is a continuation-in-part of U.S. Application Ser. No. 07/896,155, filed Jun. 10, 1992, now U.S. Pat. No. 5,314,207, both of which are hereby incorporated by reference.

BACKGROUND OF THE INVENTION

The present invention relates to a bicycle with simulated motorcycle parts, and more particularly to a shroud or body shell that can fit over the top tube and around the seat post of a child's bicycle to make the bicycle look like a motorcycle.

Over the years, a number of attachments to bicycles to simulate motorcycle parts have been proposed. For example, a simulated gas tank affixed to the top tube of a bicycle has been known.

U.S. Pat. No. 3,210,889 to Lyman discloses a simulated engine which mounts over the rear wheel of a bicycle.

U.S. Pat. No. 1,498,677 to Bemis et al. discloses a child's walking bicycle that has a body plate mounted between the frame members with an illustration of a motorcycle engine stenciled or printed thereon.

Other attachments to be added to a tricycle for simulating an airplane, rocket ship, submarine or other vehicles are disclosed in U.S. Pat. No. 2,761,689 to Becker.

A number of design patents disclose bicycles or parts therefore which appear to simulate motorcycles and parts thereof. See U.S. Pat. Nos. D 166,693; D 170,610; D 203,146; D 245,002; D 246,170; D 246,779; D 250,329; D 291,292 and D 343,810. Improvements can still be made, however, to provide simple attachments that can be added to a conventional child's bicycle that will make the bicycle more realistically simulate a motorcycle.

SUMMARY OF THE INVENTION

Attachments have been invented which can be added to a bicycle to make it more realistically simulate a motorcycle. In one aspect, the invention comprises a combination of a bicycle and attachments attachable to the bicycle to simulate a motorcycle, the bicycle comprising a frame having a seat tube and a seat mounted on a seat post within said seat tube, the seat having a lower outer surface, the attachments comprising a shroud having a center portion having an upper surface, a rear fender portion for extending over a rear wheel of the bicycle, and a front portion simulating a gas tank.

In another aspect the invention comprises a bicycle having attachments to simulate a motorcycle, the bicycle comprising a frame including a head tube, a top tube, a down tube, a seat tube and seat and chain stays, crank pedals rotatably mounted on the frame, a front wheel mounted on a front fork pivotally mounted in the head tube, a rear wheel mounted on the seat and chain stays, handlebars attached to the front fork for steering the bicycle, and a seat mounted to the seat tube; and the attachments comprising a simulated motorcycle gas tank mounted over the top tube, a rear fender extending over the rear wheel, and a front fender extending over the front wheel, wherein the simulated gas tank and rear fender comprise parts of a body shell.

In another aspect, the invention comprises a bicycle with a plastic body shell to simulate a motorcycle; the bicycle comprising a frame, a front wheel, a rear wheel, handlebars and pedals mounted on the frame, and frame extensions extending from the bicycle from each side thereof; the body shell comprising a rear fender portion extending over the rear wheel and having a hole through the body shell on each side thereof; the extensions being located behind the pedals and above the axle of the rear wheel and extending through the holes in the body shell, and sufficiently long compared to the width of the plastic body shell such that the extremities of the handlebars, pedals and frame extension on each side of the bicycle define a plane which does not intersect the body shell.

In yet another aspect, the invention comprises a bicycle with attachments to simulate a motorcycle, the bicycle comprising a frame, including a head tube, seat tube and down tube, front and rear wheels rotatable mounted to the frame, and a bicycle seat with an adjustable height mounted on the seat tube; and the attachments comprising a shroud having a simulated gas tank and rear fender portion, the shroud having a central portion with a hole therethrough through which the seat tube passes.

In still another aspect, the invention comprises a bicycle with a front fork, a front and rear wheel, handlebars and a seat and simulating a motorcycle comprising a molded plastic simulated motorcycle engine comprising a simulated exhaust system and shock absorber; a body shell that includes a simulated gas tank that fits on top of a portion of the simulated engine and a rear fender portion that extends over the rear wheel.

The attachments more realistically simulate a motorcycle than other prior art devices. Also, in some embodiments the attachment designs accommodate adjustment of the height of the bicycle seat to accommodate a growing child.

These and other advantages, as well as the invention itself, will be best understood in light of the drawings, a brief description of which follows.

BRIEF DESCRIPTION OF THE DRAWINGS

FIG. 5 is an enlarged perspective view of a head section of the bicycle of FIG. 1 without the motorcycle parts to show a turning limiter feature of the first embodiment.

FIGS. 6A, 6B and 6C are sectional views taken along line 6—6 of FIG. 5, showing the head section of FIG. 5 with the handlebars in three different positions.

FIG. 16 is a front elevational view of the bicycle and attachments of FIG. 11.

FIG. 17 is a rear elevational view of the bicycle and attachments of FIG. 11.

DETAILED DESCRIPTION OF THE DRAWINGS AND PREFERRED EMBODIMENTS OF THE INVENTION

Figure 7:
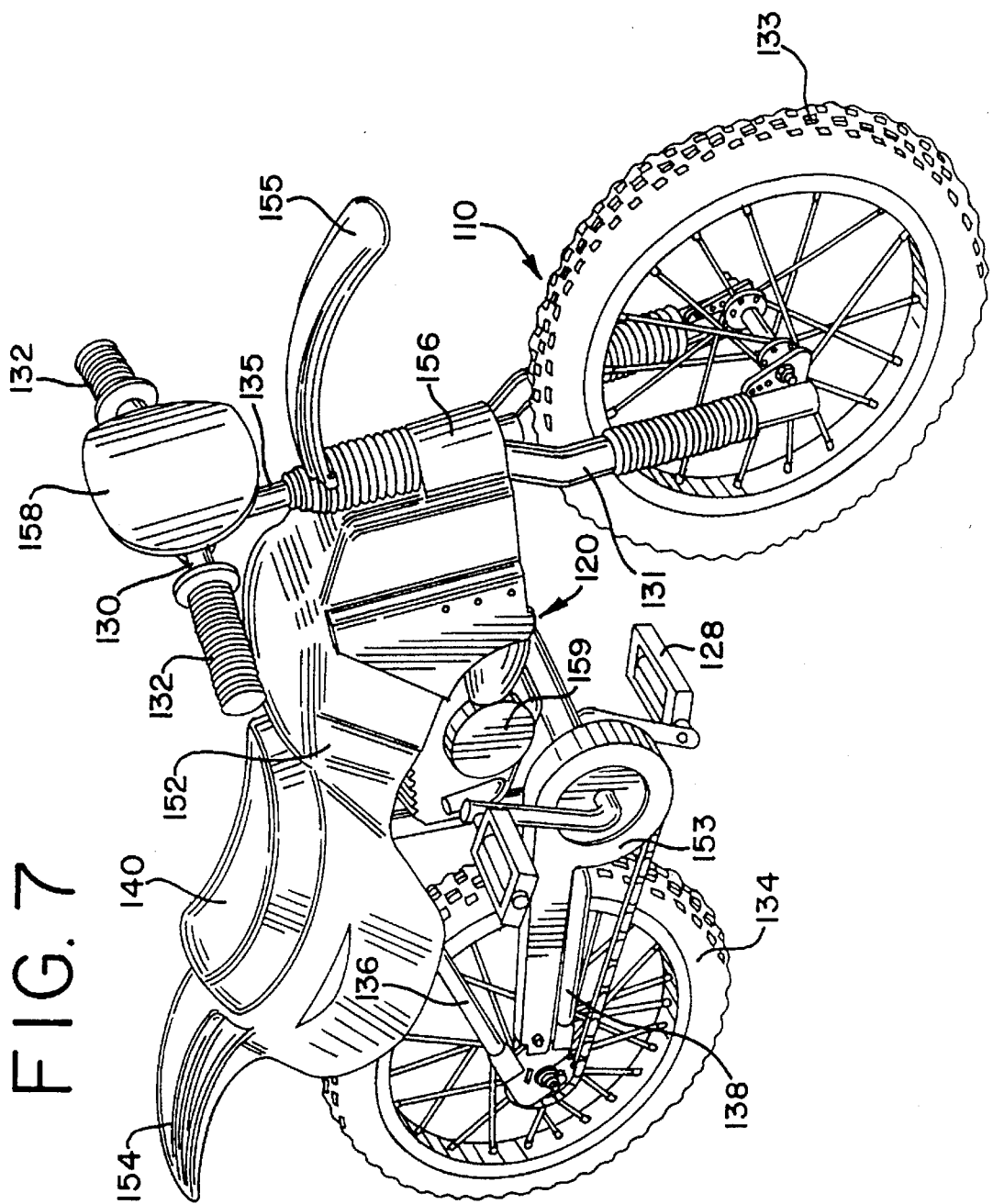
FIG. 7 is a perspective view of a bicycle with attachments of a second preferred embodiment of the invention.
Figure 8:
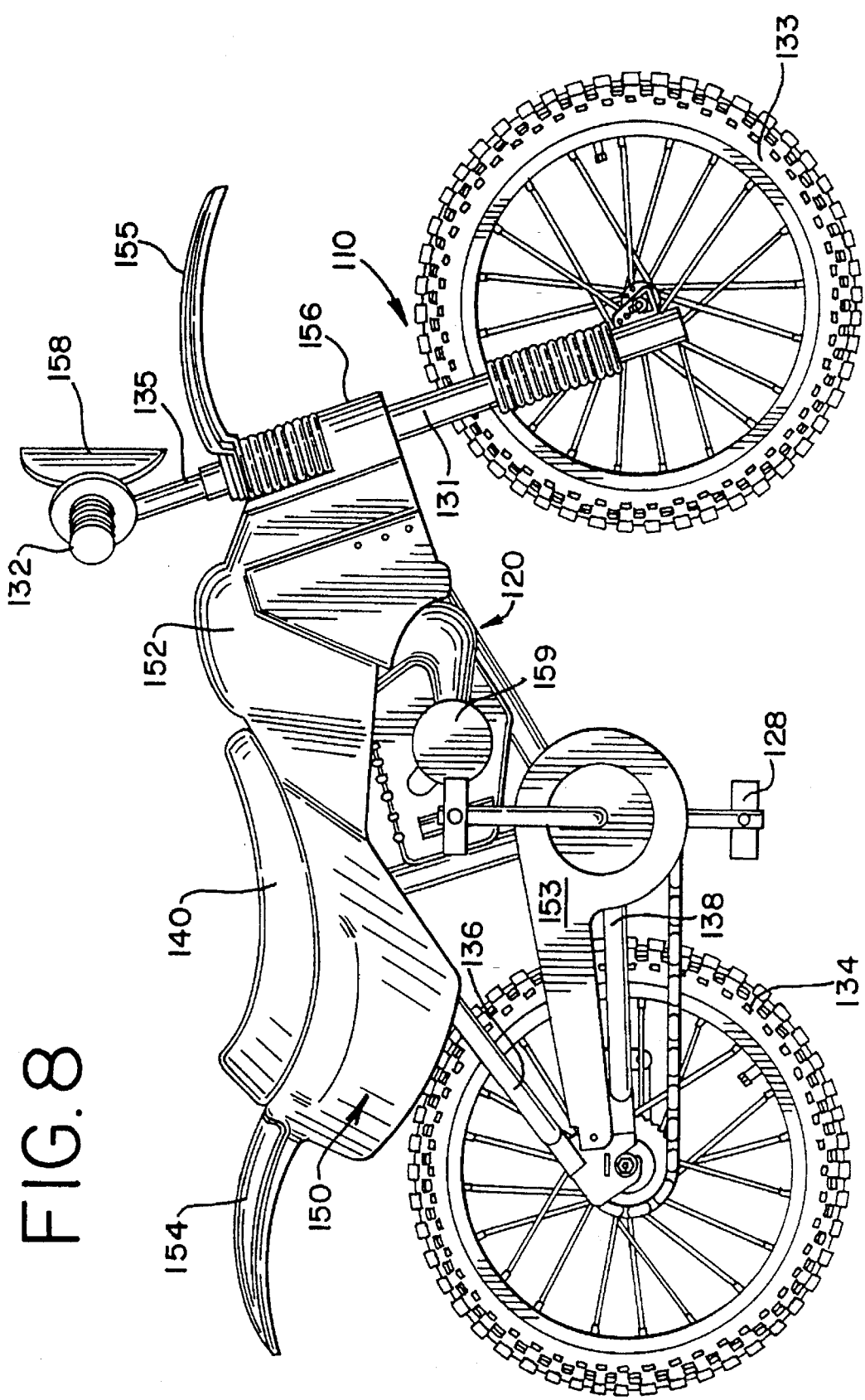
FIG. 8 is a side elevational view of the bicycle and attachments of FIG. 7.
Figure 9:
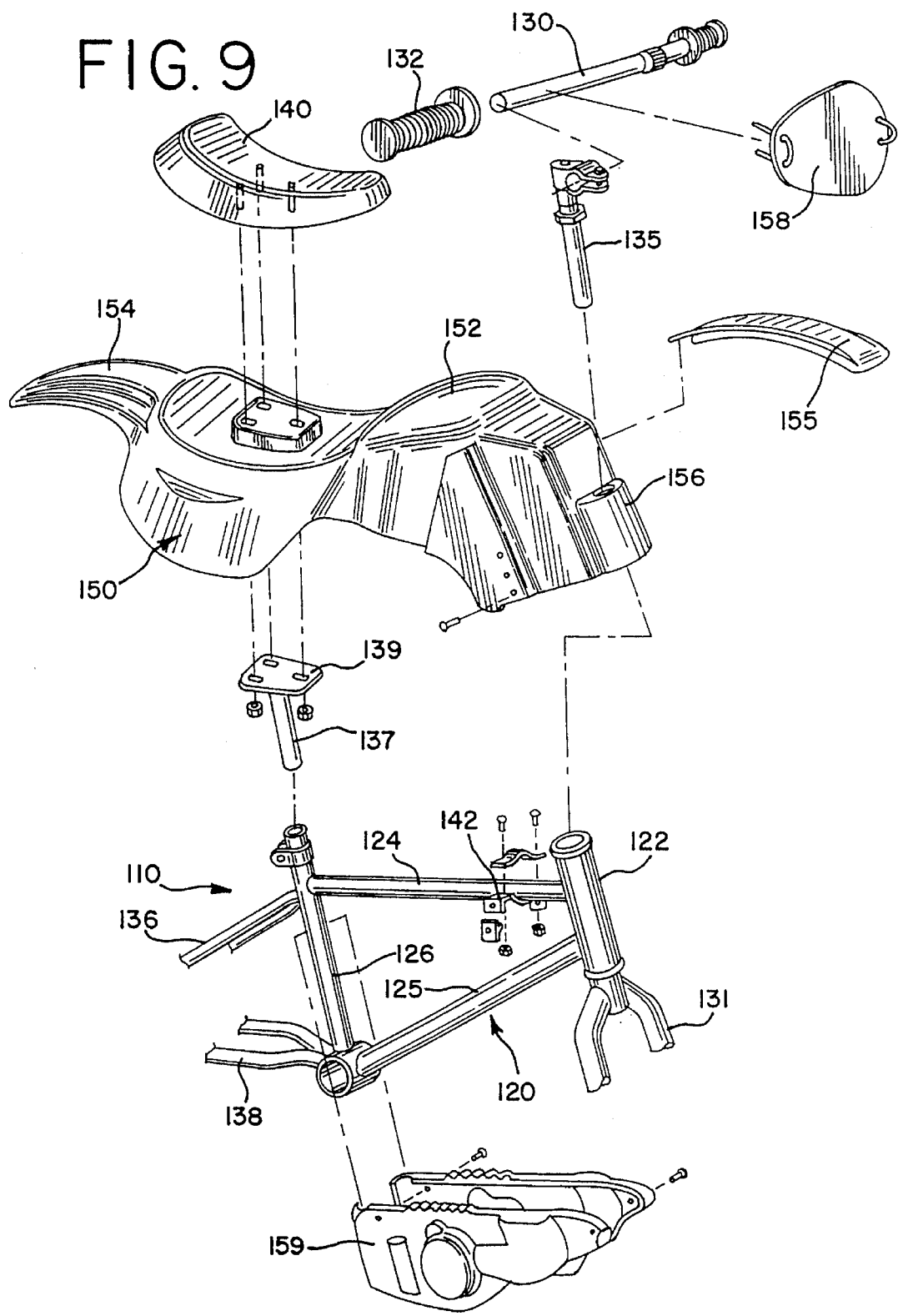
FIG. 9 is an exploded view of the bicycle and attachments of FIG. 7.
Figure 10:
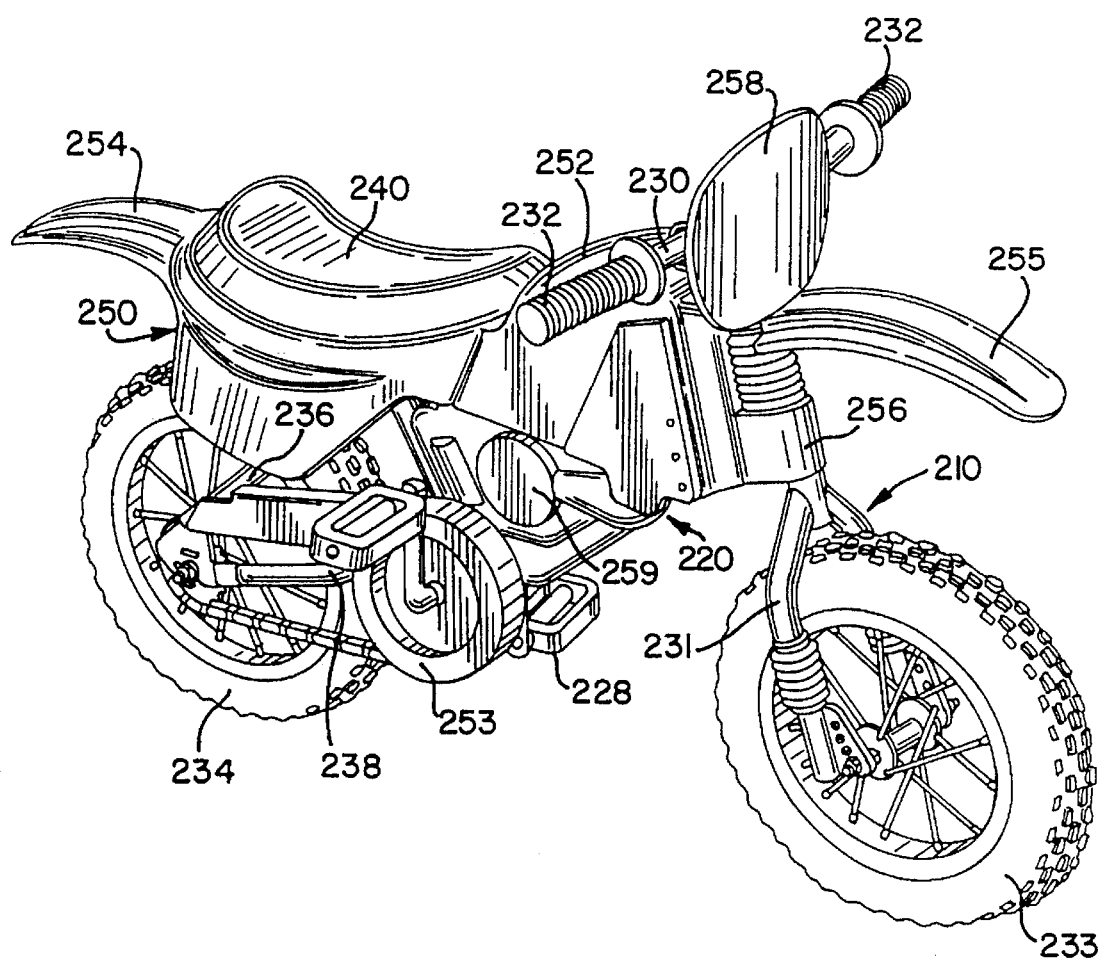
FIG. 10 is a perspective view of a bicycle with attachments of a third preferred embodiment of the invention.
Figure 11:
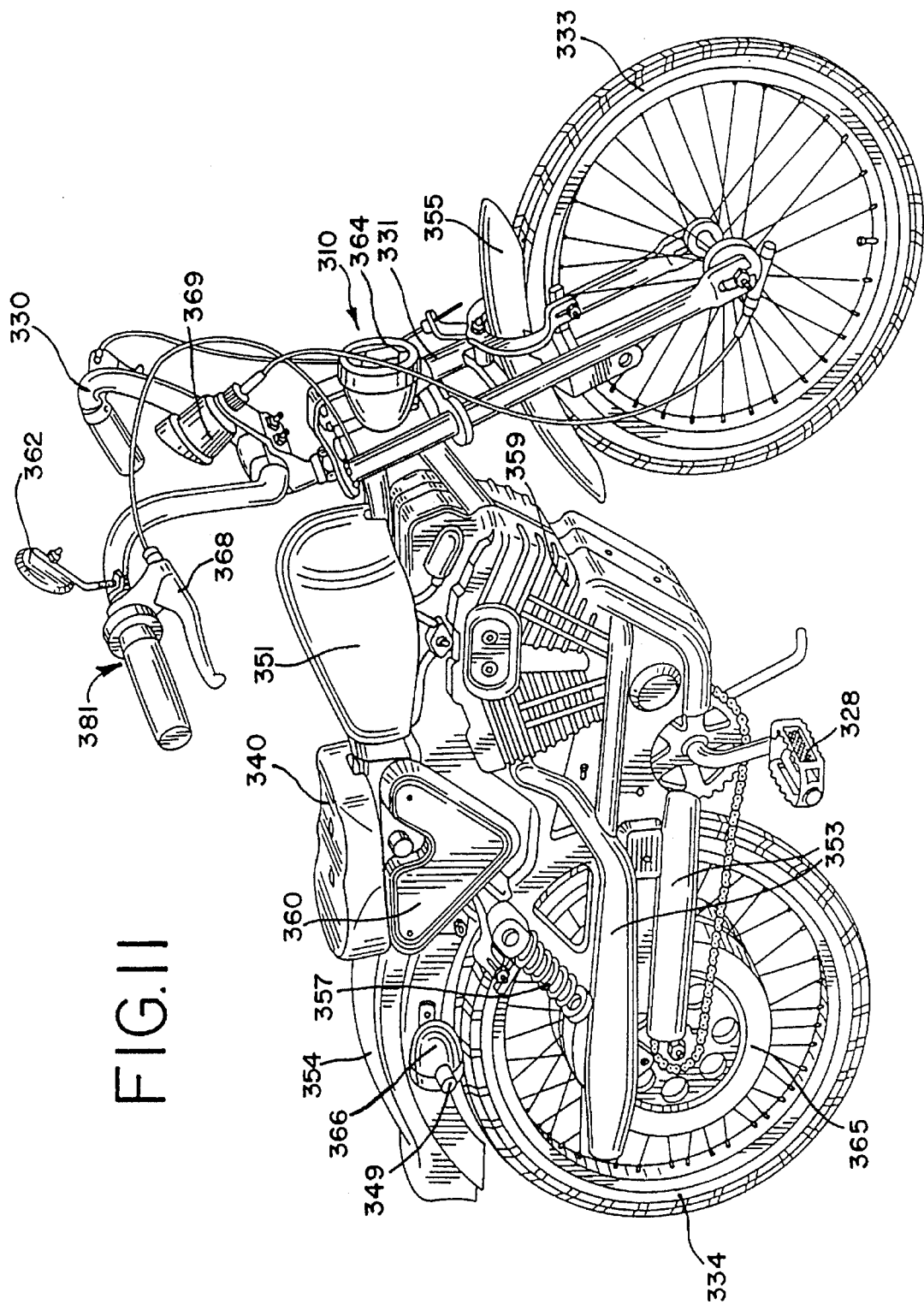
FIG. 11 is a perspective view of a bicycle with attachments of a fourth preferred embodiment of the invention.
Figure 12:
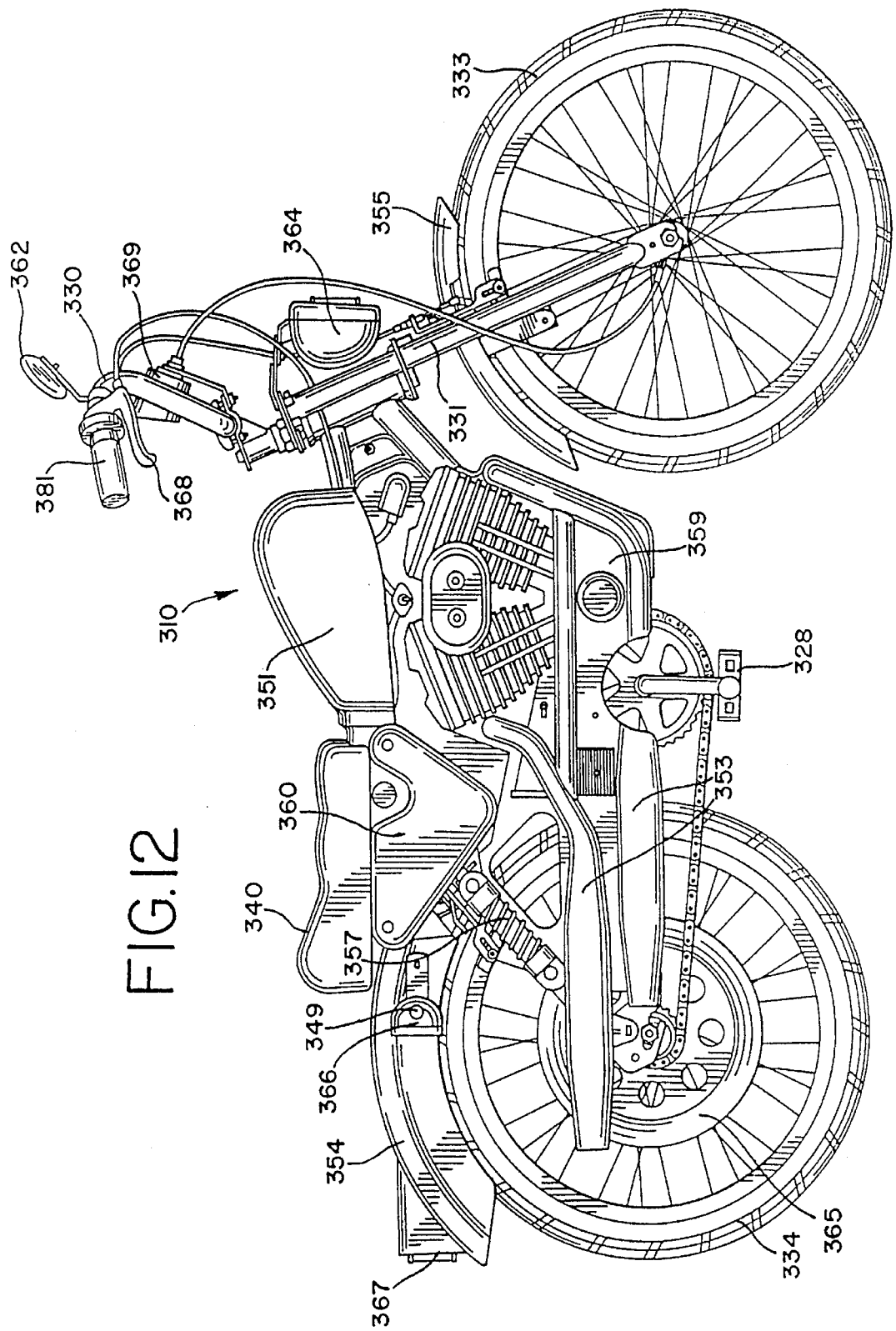
FIG. 12 is a right side elevational view of the bicycle and attachments of FIG. 11.
Figure 13:
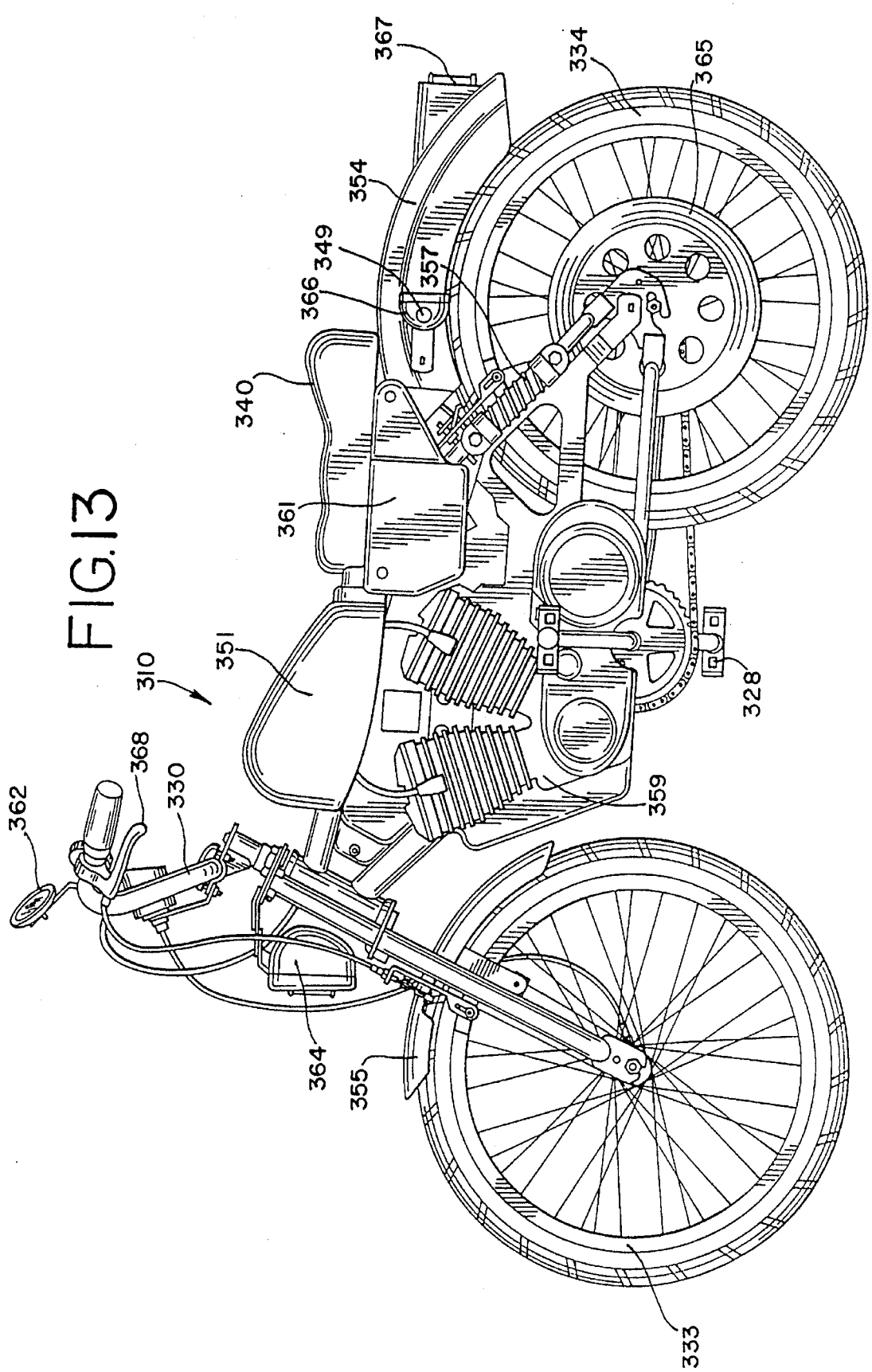
FIG. 13 is a left side elevational view of the bicycle and attachments of FIG. 11.
Figure 14:
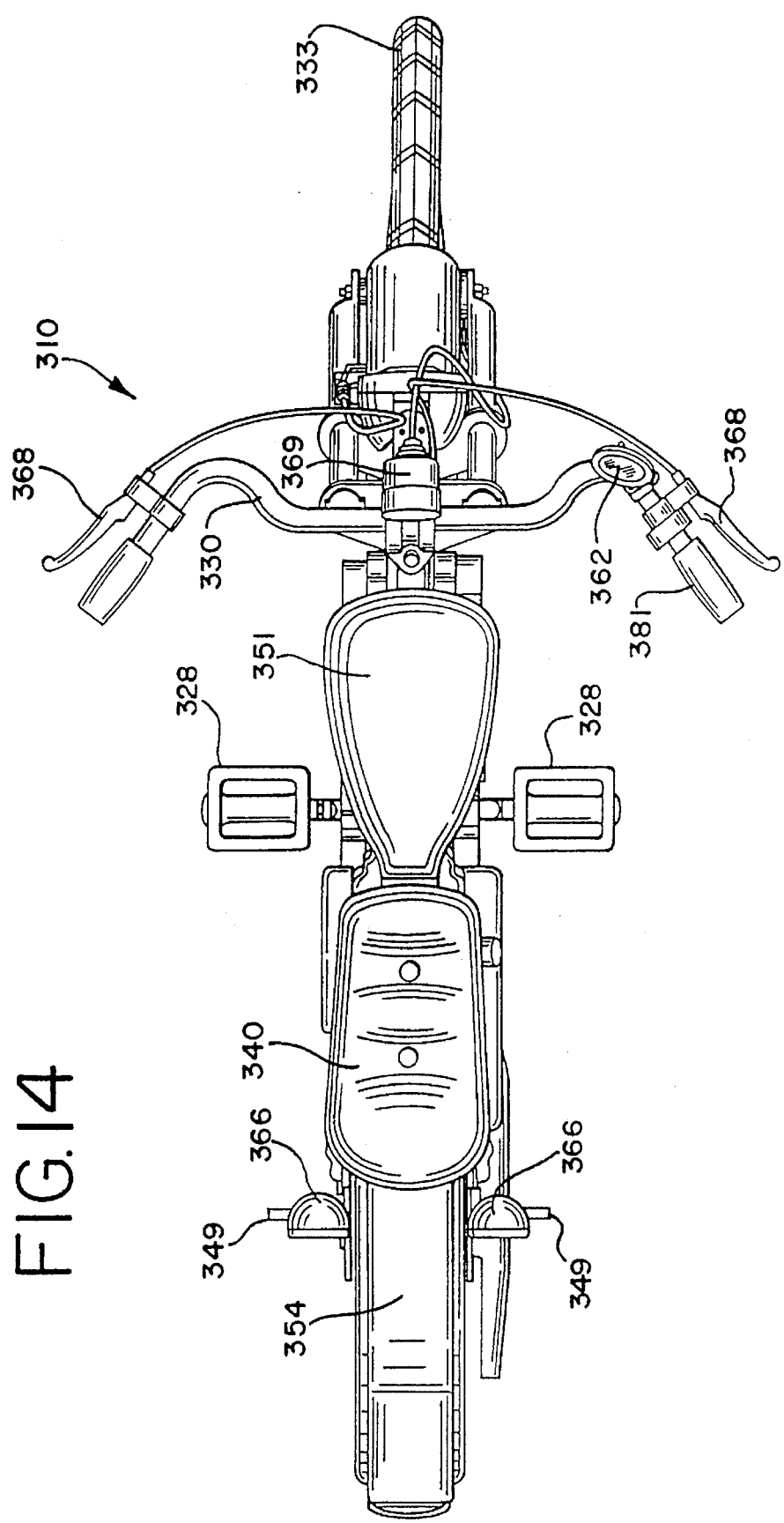
FIG. 14 is a top plan view of the bicycle and attachments of FIG. 11.
Figure 15:
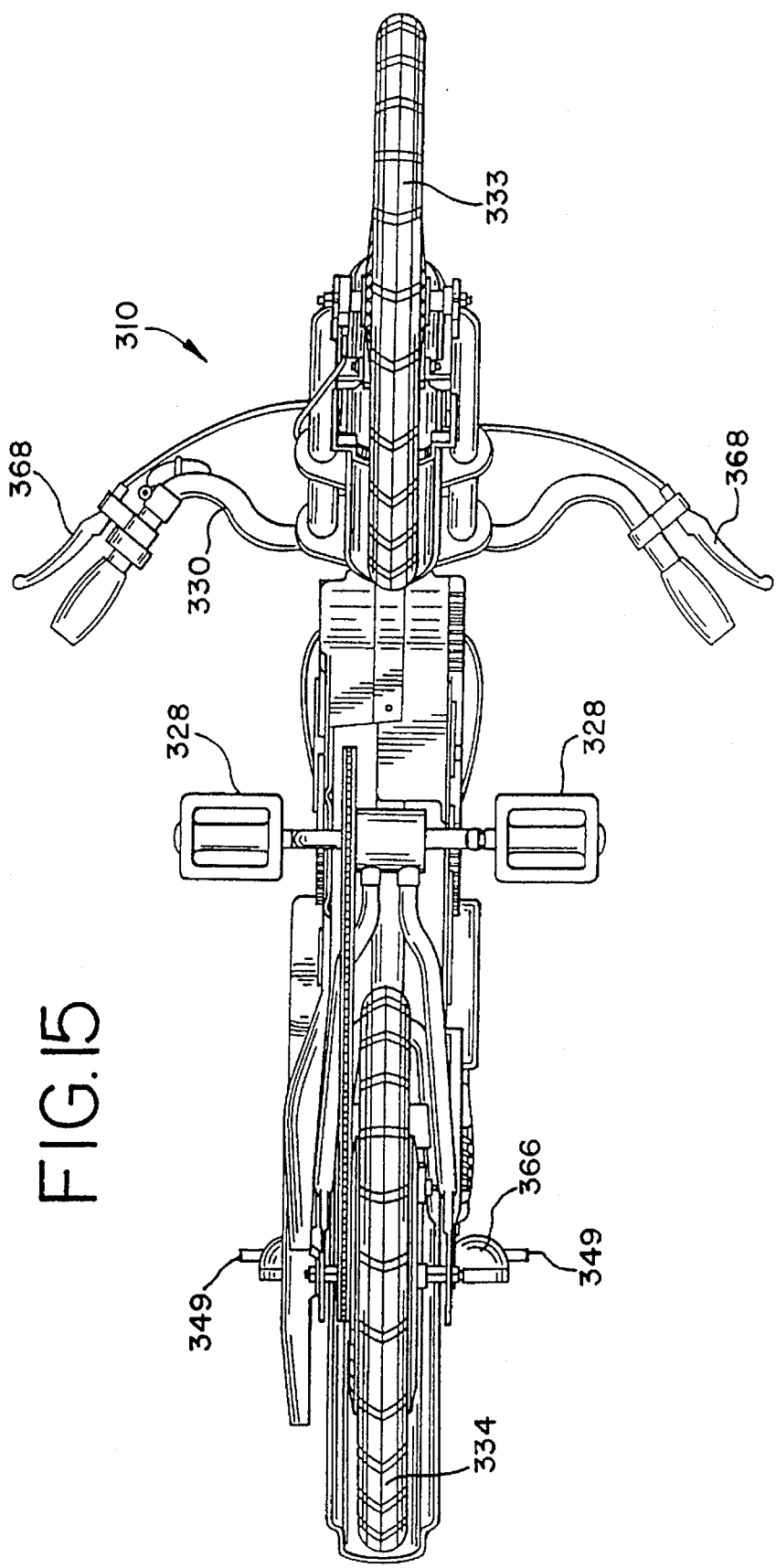
FIG. 15 is a bottom plan view of the bicycle and attachments of FIG. 11.

There are five preferred embodiments of the present invention, designed for use with different sizes of children's bicycles. The first preferred embodiment, shown in FIGS. 1–6, is designed for a 20" bicycle. The second preferred embodiment, shown in FIGS. 7–9, is designed for a 16" bicycle. The third preferred embodiment, shown in FIG. 10, is designed for use with a 12" bicycle. The fourth preferred embodiment, shown in FIGS. 11–21 is designed for a 20" bicycle. The fifth preferred embodiment, shown in FIGS. 22–29, is a 10" bicycle.

In the first four embodiments, the bicycle is of a standard design. In fact, one of the advantages of these embodiments of the present invention is that they can be used on standard bicycles, with the further advantage that the attachments are disconnectably secured to the bicycle so that they may be removed, leaving the bicycle in its conventional form.

Figure 3:
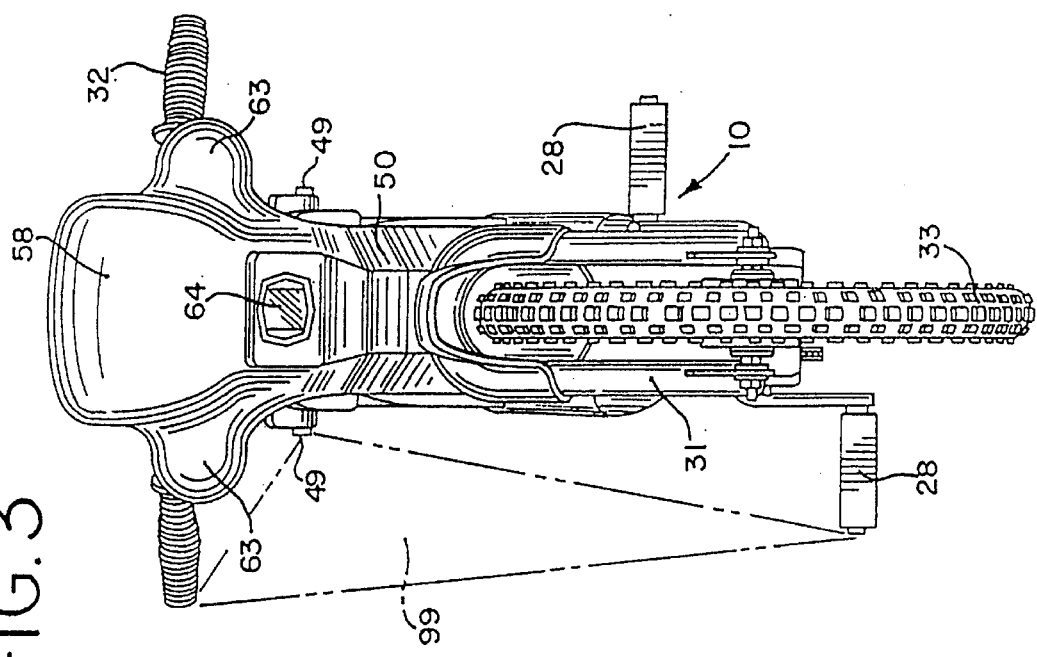
FIG. 3 is a front elevational view of the bicycle and attachments of FIG. 1.
Figure 4:
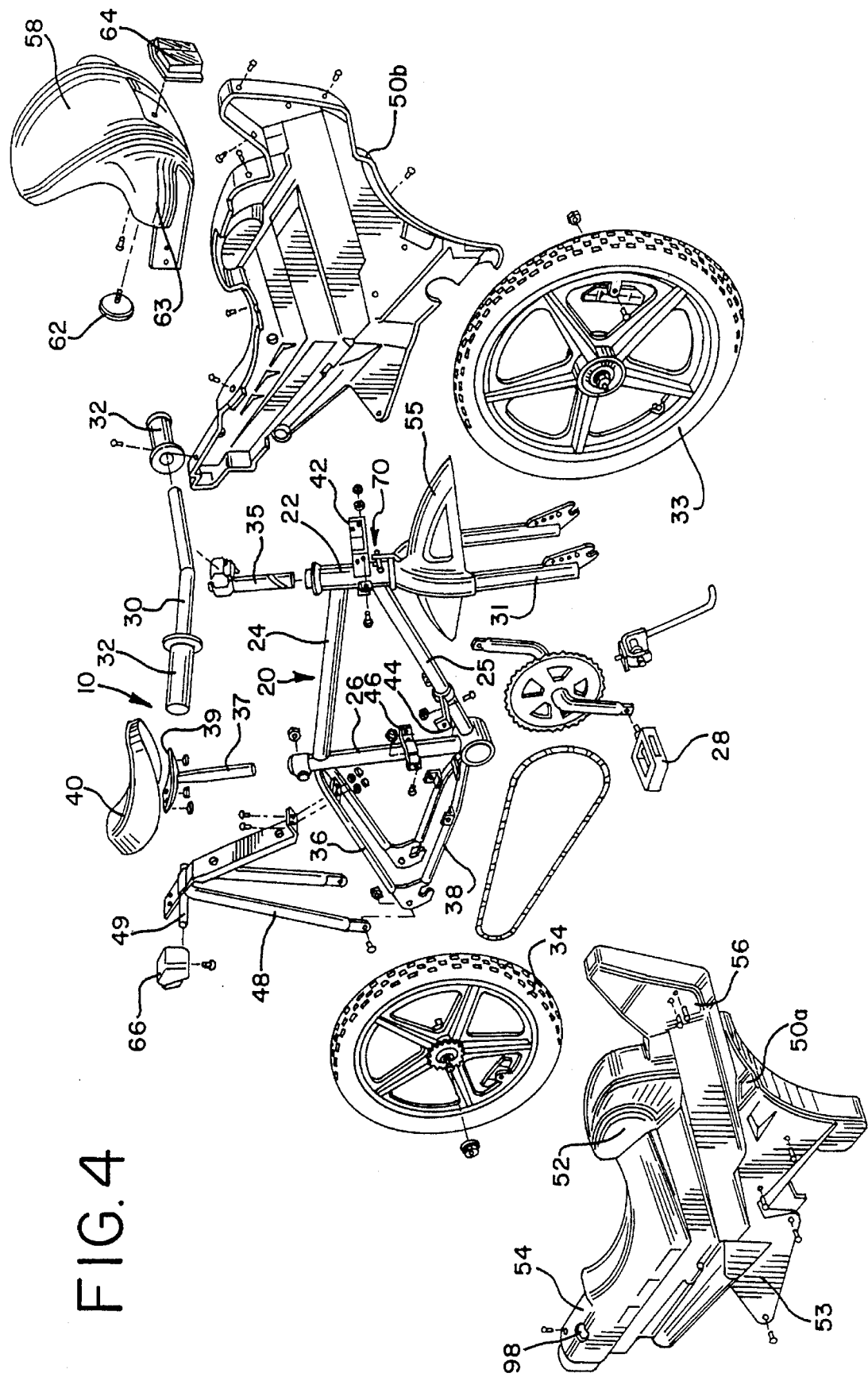
FIG. 4 is an exploded view of the bicycle and attachments of FIG. 1.

In the embodiment shown in FIGS. 1–6, the bicycle 10 and attachments simulate a motorcycle sometimes referred to as a "cafe racer." As best seen in FIG. 4, the bicycle 10 includes a frame 20 including a head tube 22, a top tube 24, a down tube 25, a seat tube 26 and crank pedals 28. The bicycle 10 also includes a front wheel 33 mounted on a front fork 31 pivotally mounted in the head tube 22, with handlebars 30 attached to the front fork 31 via a stem 35 for steering the bicycle 10, a rear wheel 34 mounted on seat stay 36 and chain stay 38 attached to frame 20, and a seat 40 mounted to the seat tube 26 at an adjustable height on a seat post 37. These and the other bicycle 10 components not mentioned are standard, and constructed in a standard fashion.

The seat 40 is secured to the seat post 37 in a fixed manner such that the seat is prevented from pivoting on the seat post 37. In the preferred embodiments, the seat is affixed to a seat plate 39 welded to the top of the seat post 37.

The attachments to simulate a motorcycle include a body shell or shroud 50 (FIG. 1), a front fender 55 and a fairing 58 mounted in front of the handlebars 30. As best seen in FIG. 4, the shroud 50 is a plastic molded body shell. In the first preferred embodiment, it is made from two halves 50a and 50b that are mounted to the frame 20 by brackets 42, 44, 46 and 48 so as to fit around the seat tube 26 and over the top tube 24. In the preferred embodiment, the body shell 50 completely covers the top tube 24 and down tube 25.

Figure 1:
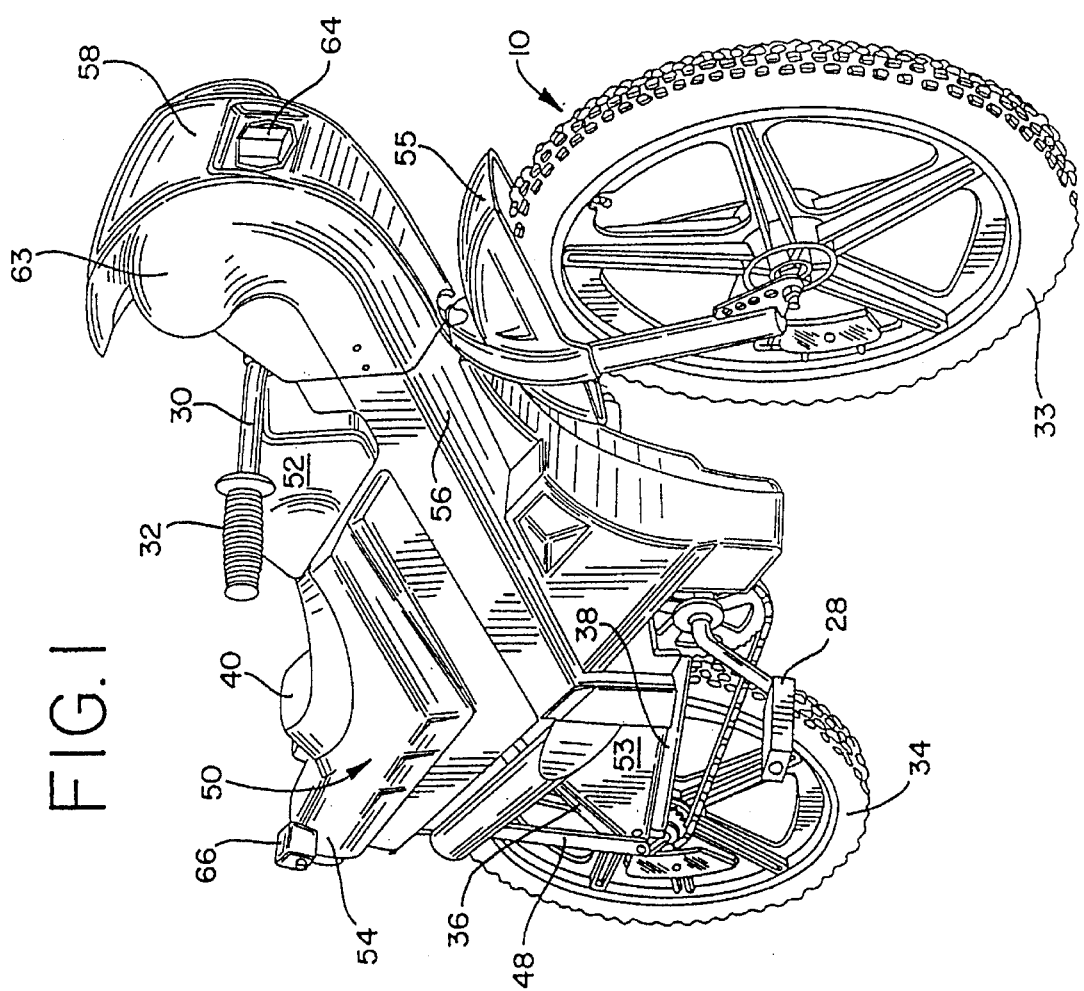
FIG. 1 is a perspective view of a bicycle with attachments of a first preferred embodiment of the invention.
Figure 2:
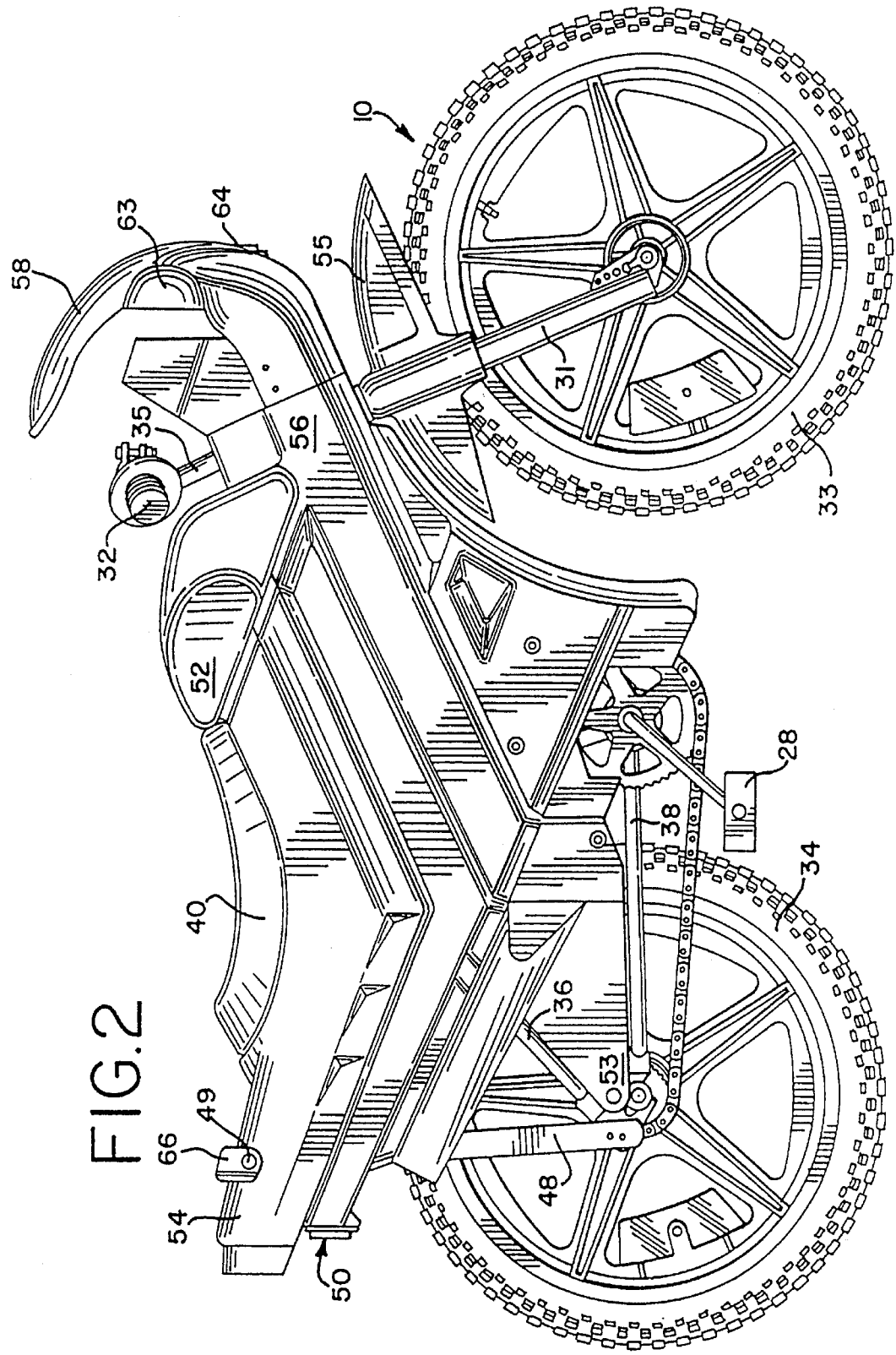
FIG. 2 is a side elevational view of the bicycle and attachments of FIG. 1.

The preferred shroud 50 includes a center portion 52 simulating a gas tank, a rear fender portion 54 extending over the rear wheel 34 of the bicycle 10 and a front portion 56 for attaching the shroud 50 to the head tube 22. The center portion 52 includes an aperture therein (formed by the two halves 50a and 50b) sized to fit around the seat tube 26. The center portion 52 also simulates the engine portion of a cafe racer motorcycle, and has a concave, contoured upper surface configured to follow and closely match the contour of the lower outer surface of seat 40 of the bicycle 10. Thus, as seen in FIGS. 1–3, the bicycle seat 40 appears as an integral part of the design of the simulated motorcycle. In the preferred embodiment, the shroud or body shell 50 comprises the chain guard 53 for the bicycle.

The fairing 58 preferably comprises a molded plastic member that attaches to the shroud 50 to extend the contour lines of the shroud 50, adding to the aesthetic appearance of the simulated motorcycle design. In this first embodiment, the fairing 58 does not pivot with the handlebars 30. The fairing 58 connects to the shroud 50 and frame 22 by use of the bracket 42. As best seen in FIGS. 1 and 3, the fairing 58 includes a reflector 64 mounted to simulate a motorcycle headlight. As seen in FIG. 4, two mirrors 62 (only one of which is shown) are mounted facing backwards on side extensions 63 of the fairing 58, again simulating the design of a motorcycle fairing.

As best shown in FIGS. 5 and 6A–C, where the shroud 50, front fender 55 and fairing 58 have been omitted, the bicycle 10 includes a turning limiter 70 for limiting the degree of pivotability of the front fork 31. This provides a safety feature for the bicycle 10 with the described attachments in that the turning limiter 70 prevents the handlebars 30 from turning so far as to create pinch points with the fairing 58 or gas tank portion of the shroud 50. The turning limiter 70 comprises an arcuate rod 72 mounted horizontally on the head tube 22 and a hook 74 extending vertically from the front fork 31. As shown in FIGS. 6A–6C, as the handlebars 30 (shown in dashed lines in their relative position above the head tube) are turned from side to side, the hook 74 contacts the stops provided by the arcuate rod 72, limiting the handlebar 30 from turning further.

As best seen in FIG. 4, the front fender 55 rests on top of the crown of front fork 31 and includes a hole so that the hook 74 may pass upwardly through the fender 55.

The rear bracket 48, mounted to the seat stay 36, is provided with side extensions 49, best seen in FIG. 4, extending from the bicycle 10 on each side thereof and through holes 98 formed on each side of the body shell or shroud 50. The purpose of the side extensions 49 is to cooperate with handlebars 30 and crank pedals 28 to prevent the shroud 50 from contacting the ground if the bicycle 10 should be tipped over. As best seen in FIG. 3, the extremities of the handlebars 30 and peddles 28 protrude from the side of bicycle 10 quite a bit further than the shroud 50. Extensions 49 are wider than shroud 50, and the ends of extensions 49 provide a third point on each side of the bicycle, thus defining a plane 90. Neither plane 99 nor the plane formed by the same components on the other side of the bicycle intersect the body shell 50. The extensions are preferably located on the upper-rear portion of the bicycle, above the axle of the rear wheel 35 and behind the pedal 28. The position and length of extensions 49 should be such that if one end of the handlebars 30, one pedal 28 and one extension 49 were lying on the ground, the rest of the bicycle 10 and attachments, including the rear fender 54, would all be above the plane of the ground. Simulated turn signal lights 66 are attached to side extensions 49 to cosmetically cover the extensions as well as to add realism to the simulated motorcycle design.

Since the shroud 50 is attached to the frame 20 by brackets 42, 44, 46 and 48, in this first embodiment the height of the seat 40 is adjustable independent of the height of the simulated gas tank and engine.

In the preferred first embodiment, the handlebars 30 are generally straight, and have handlebar grips 32 to further simulate a motorcycle appearance. Also, preferably the wheels 33 and 34 have a "mag wheel" five pointed design.

The second preferred embodiment of the invention, FIGS. 7–9, utilizes many of the features of the first embodiment. Therefore, reference numbers for the components in the second embodiment that are also found in the first embodiment are the same last two digits, increased by an addend of 100. For example, the bicycle 110 has a frame 120, just as the bicycle 10 of the first embodiment has a frame 20.

The most noticeable difference in the second embodiment is that the shroud 150 is a monolithic, unitary molded piece, rather than a two piece design, and a number plate 158 is used instead of the fairing. The number plate 158 attaches directly to the handlebars 130 by straps (FIG. 9) and thus pivots with the handlebars 130. The motorcycle design of the second embodiment is that of a "dirt bike" style of motorcycle. Thus, the front fender 155 is raised up higher and attaches between the top of head tube 122 and stem 135. The fender 155 is attached to a bracket that is either along side or used in place of the washer normally found at the top of head tube 122.

The shroud 150 has a center portion 152 simulating a gas tank. The center portion fits around the seat tube 126 of bicycle 110 and completely covers the top tube 124. In this embodiment, however, the shroud 150 is attached to the underside of seat 140 (FIG. 9) and moves up and down with adjustment to the height of seat 140. The center portion 152 is configured to follow the contour of the seat 140. Also, as with the first embodiment, rear fender portion 154 is integrally formed with the rest of the shroud 150. Also, the front portion 156 of the shroud 150 attaches to the head tube 122 of the bicycle 110. As best seen in FIG. 9, the front portion 156 of the shroud 150 includes a hole that allows the shroud 150 to slideably fit down over the head tube 122. A front bracket 142 attached to the top tube 124 is used to further attach the shroud 150 to the bicycle 110 and to set the height of the shroud 150. The front portion 156 has three holes on each side. Depending on the seat height, fasteners are used through one of the three sets of holes to connect the shroud 150 to bracket 142. In this fashion, the simulated gas tank 152 is adjustably connected to the frame 120 near the head tube 122 to allow the simulated gas tank to be adjusted in height with the seat height. Preferably, the unused holes are plugged.

In the second embodiment, the engine portion 159 of the attachment is not formed as part of the shroud 150, but as a separate piece, connected to the seat tube 126 of the bicycle. The engine portion 159 is a two part design with flanges that clamp around the seat tube 126 when the two parts are secured together.

The embodiment shown in FIGS. 7–9 does not include simulated rear turn signals, mag wheels or a turning limiter, though those features could be added if desired. Also, the bicycle's conventional chain guard 153 is used.

The third embodiment, shown in FIG. 10, is almost identical to the second embodiment. Therefore, the same reference numbers, increased by an addend of 100, have been used. The design of the shroud 250 and number plate 258 are modified slightly to fit a smaller bicycle 220, but otherwise attach and have the same components and function as the shroud 150 and number plate 158 of the second embodiment of the invention.

The shrouds 50, 150 and 250 are preferably molded of high density polyethylene or some other suitable plastic.

In the embodiments shown in FIGS. 11–21, the bicycle and attachments simulate one version of a Harley-Davidson® motorcycle. This fourth preferred embodiment utilizes many of the features of the first embodiment. Therefore, reference numbers for the components of the fourth embodiment that are also found in the first embodiment use the same last two digits, increased by addend of 300. For example, the bicycle 310 has a frame 320, just as the bicycle 10 of the first embodiment has a frame 20.

The most notable differences in the fourth embodiment is that the simulated gas tank 351 is quite distinct, although it is molded as one piece of monolithic shroud 350 that also has a center portion 352 (FIG. 18) with an aperture therethrough that allows the seat post 337 to pass through the shroud 350. The shroud also includes a rear fender portion 354. The shroud 350 is attached by brackets to the frame 320. The simulated gas tank 351 rests on top and partially surrounds top tube 324.

Another noticeable feature is the simulated engine 359 which, like that of the second embodiment, is made of two molded pieces of plastic that fit around the seat tube 326 and the down tube 325 when the two pieces are put together. The simulated engine 359 fits up under the bottom of top tube 324 so that the outer edges of the simulated gas tank 351 follow the contour of the top of the simulated engine 359. The piece of plastic forming the right side of simulated engine 359 also forms a simulated exhaust system, including exhaust pipes 353, that serves as the chain guard. Another piece of both plastic parts making up engine 359 simulate shock absorber-spring assemblies 357 which cover the seat stays 336 on both sides of the bicycle 310.

Attached by screws to the central portion 352 of the shroud 350 is a simulated oil filter cover 360, on the right side of the bicycle 310, and a simulated battery cover 361 on the left side of bicycle 310.

The rear wheel 334 supports a two-piece wheel disk 365 that simulates brakes on a motorcycle. The two halves of the wheel disk are the same shape.

The turn signal lights 366 have a different shape than the turn signal lights 66 on the first embodiment, but attach to side extensions 349 that cooperate with the pedals 328 and handlebars 330 to provide the same protection for the shroud 350 as described earlier for the first embodiment. Just as with the first embodiment, the extensions 349 pass through holes in the side of the rear fender portions 354. The rear fender portion 354 also supports a rear reflector 367 that simulates a brake light.

Figure 18:
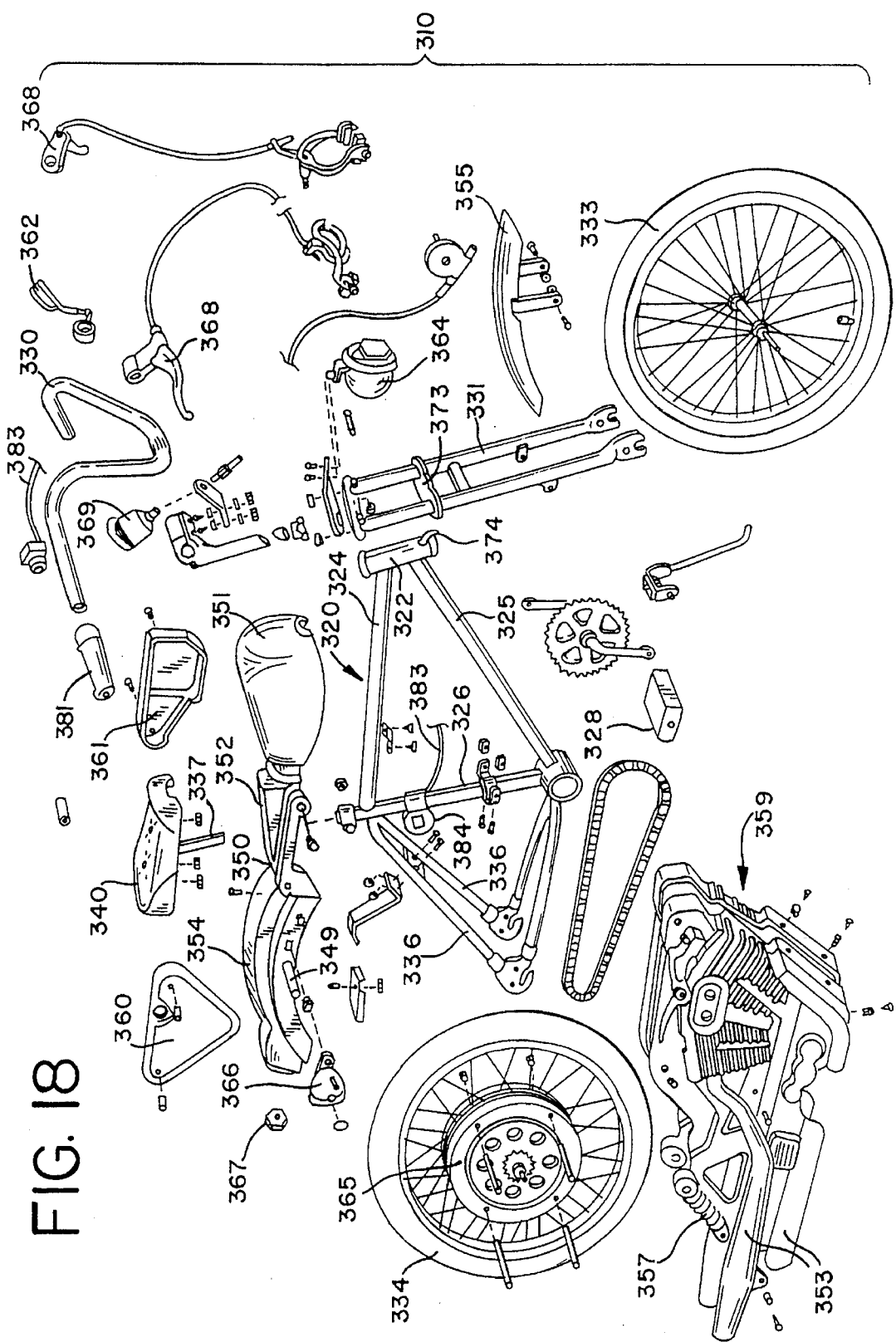
FIG. 18 is an exploded view of the bicycle and attachments of FIG. 11.

The front fork 331 has a parallel-bar configuration that differs from the front fork 31 of the first embodiment. The headlight 364 is attached to the parallel-bar members of the front fork 331 and has a rounded shape, through it supports a reflector just as in the first embodiment. The front fender 355 is also supported between the parallel bars of the front fork 331. Attached to the head tube 322 is a hook 374 which cooperates with a plate 373 on the front fork to provide a turning limiter (FIG. 18).

The seat 340 has a pillow-block shape and is made from rotational molded plastic and then cut open on the bottom so that padding and a metal plate attached to the seat post 337 can be inserted.

The simulated engine 359 can be plastic with decals to show the fins on the cylinders, or more preferably the fins are molded along with the rest of the details of the engine, exhaust pipes and shock absorbers. Preferably, the two parts of engine 359 are molded of ABS plastic and then chrome plated. The use of chrome plated simulated engine and exhaust pipes produces a very realistic look to the parts, as well as providing parts which resist scuffing normally associated with plastic simulated motorcycle parts.

A working speedometer 369 is preferably connected to the handlebars 330 and operatively coupled to the front wheel 333. Such speedometers are well known in the art. A mirror 362 is also mounted on the handlebars, as well as front and rear brake levers 368.

Figure 19:
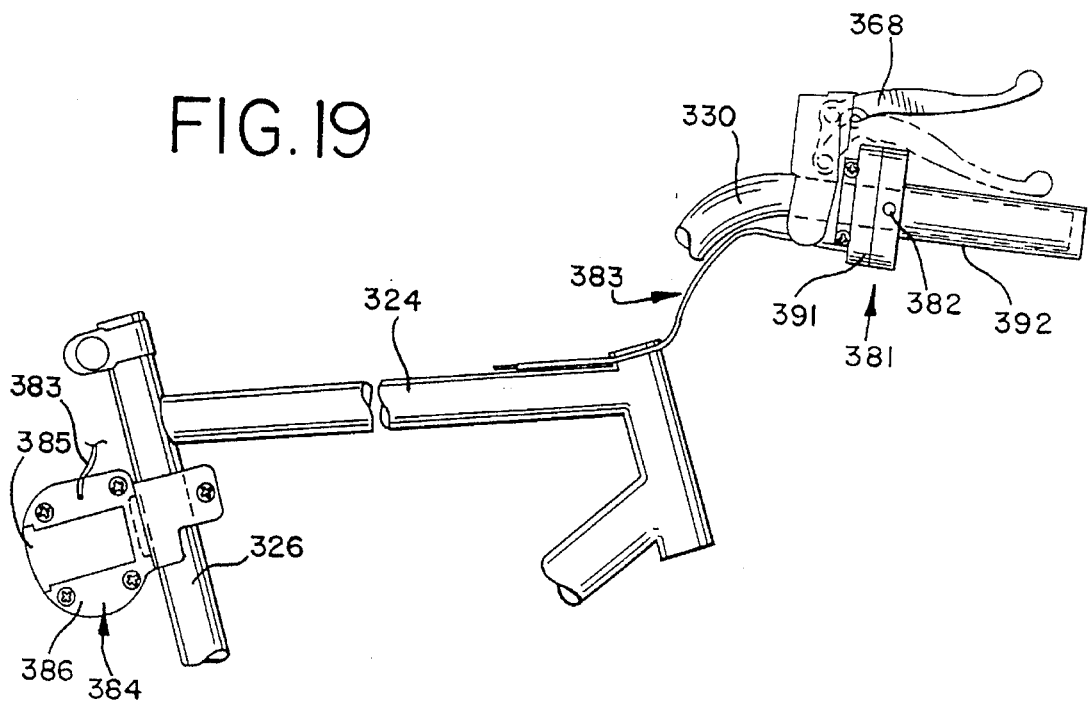
FIG. 19 is a schematic representation of the sound system for the bicycle of FIG. 11.
Figure 19A:
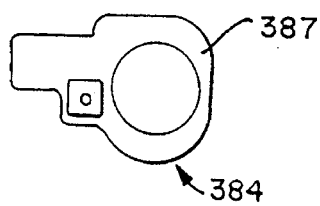
FIG. 19A is a left side elevational view of the sound box of FIG. 19.
Figure 19B:
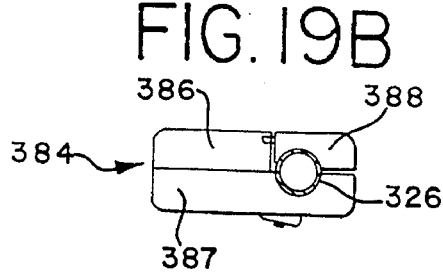
FIG. 19B is a bottom plan view of the sound box of FIG. 19.
Figure 19C:
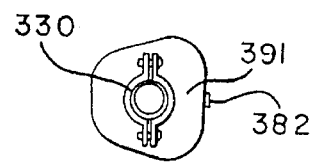
FIG. 19C is a rear elevational view of the twist grip sound actuator of FIG. 19.
Figure 19D:
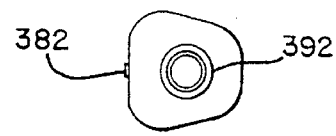
FIG. 19D is a front elevational view of the twist grip sound actuator of FIG. 19.
Figure 20:
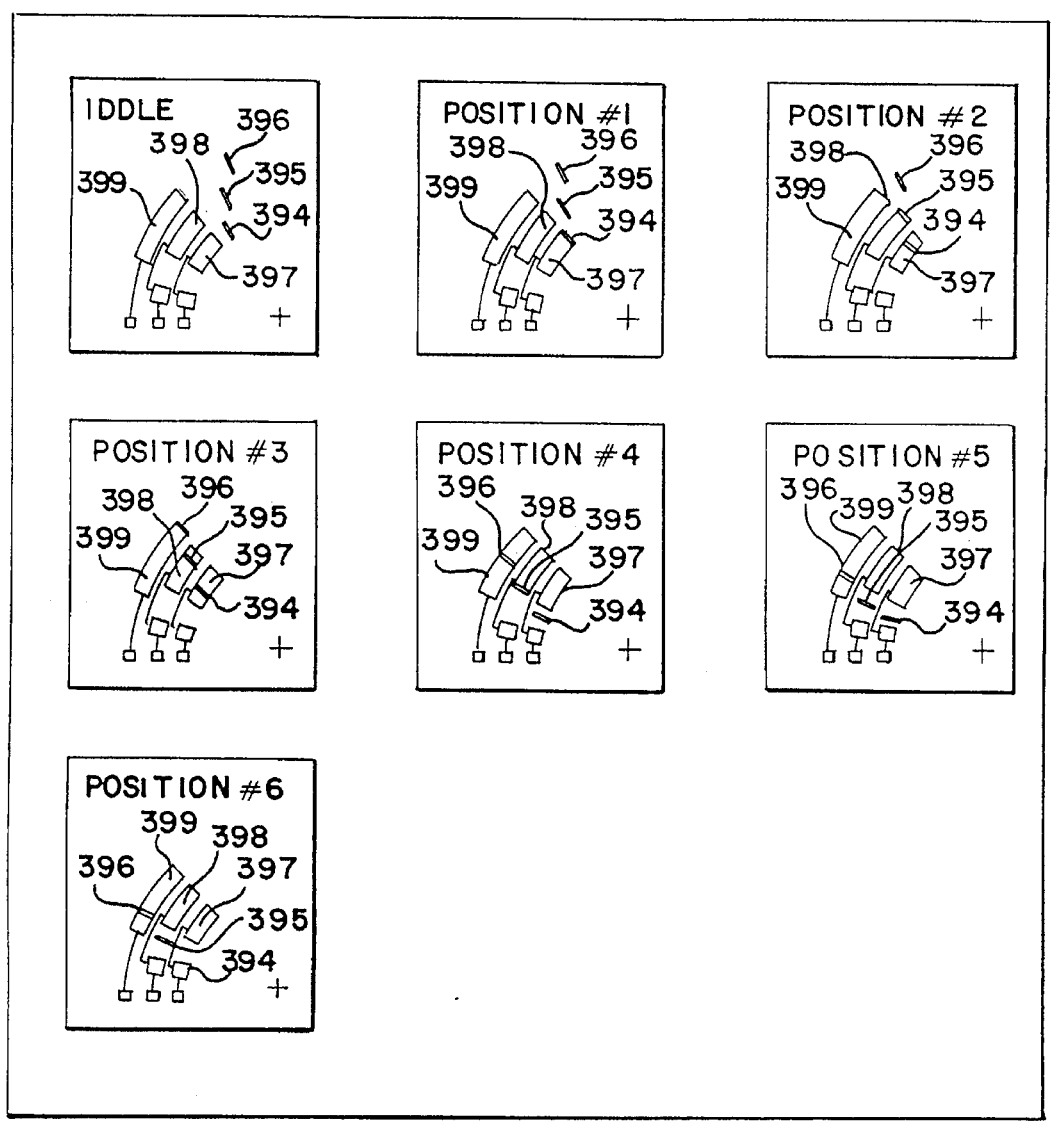
FIG. 20 is a schematic representation of the contacts for the twist grip sound actuator of FIG. 19.
Figure 21:
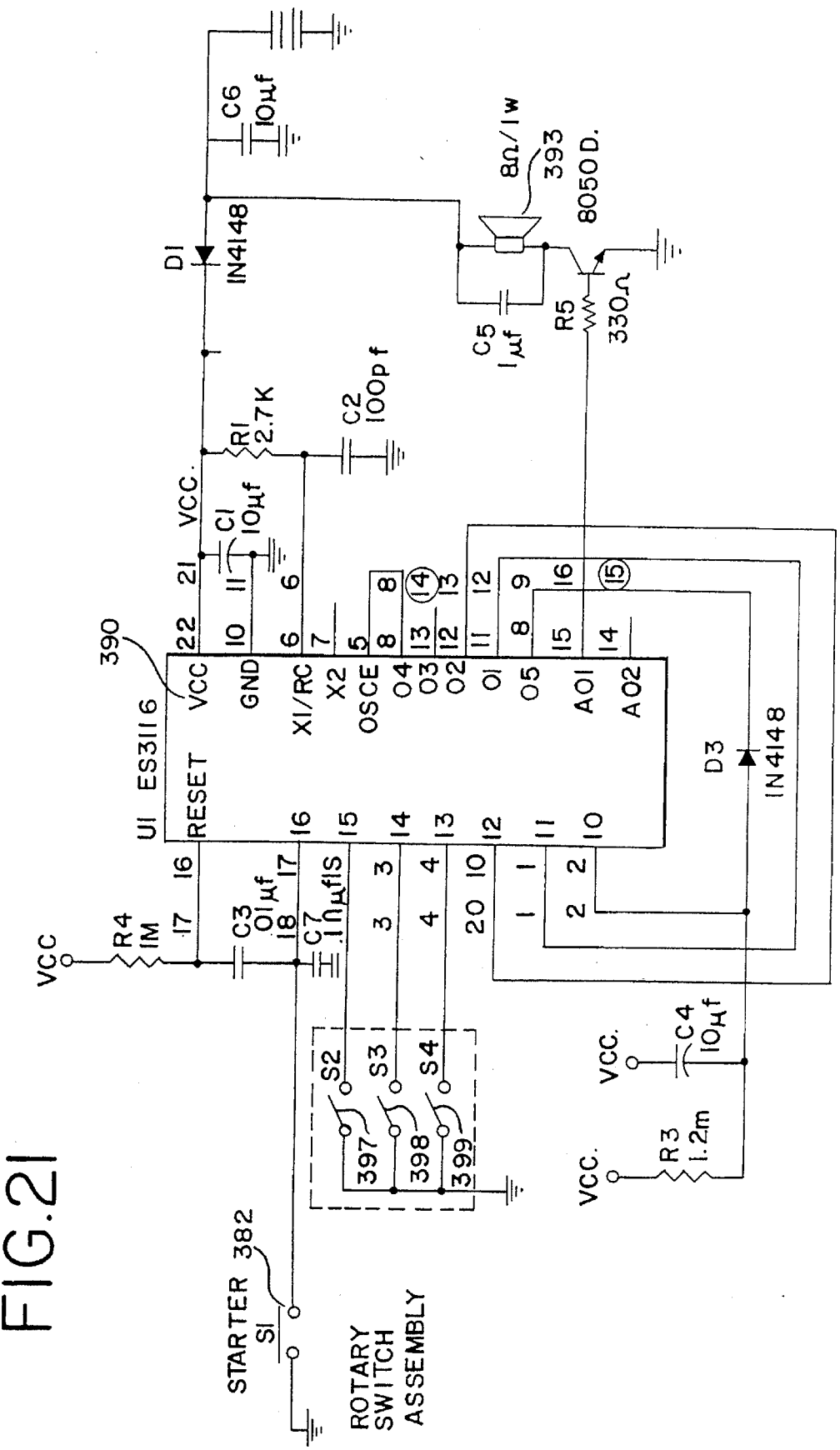
FIG. 21 is a schematic drawing of the electrical system for the sound box of FIG. 19.
Figure 22:
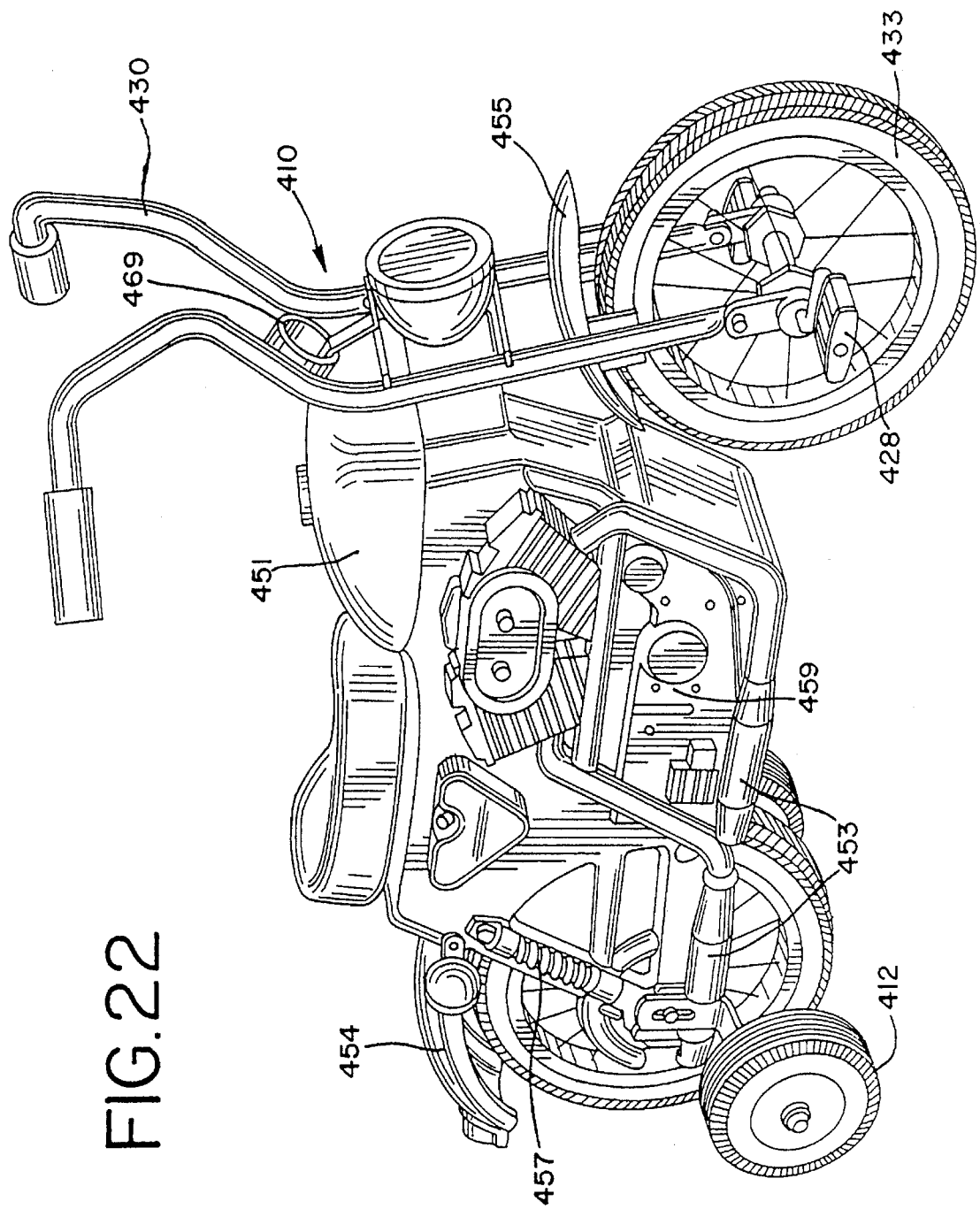
FIG. 22 is a perspective view of a bicycle of a fifth preferred embodiment of the invention.
Figure 23:
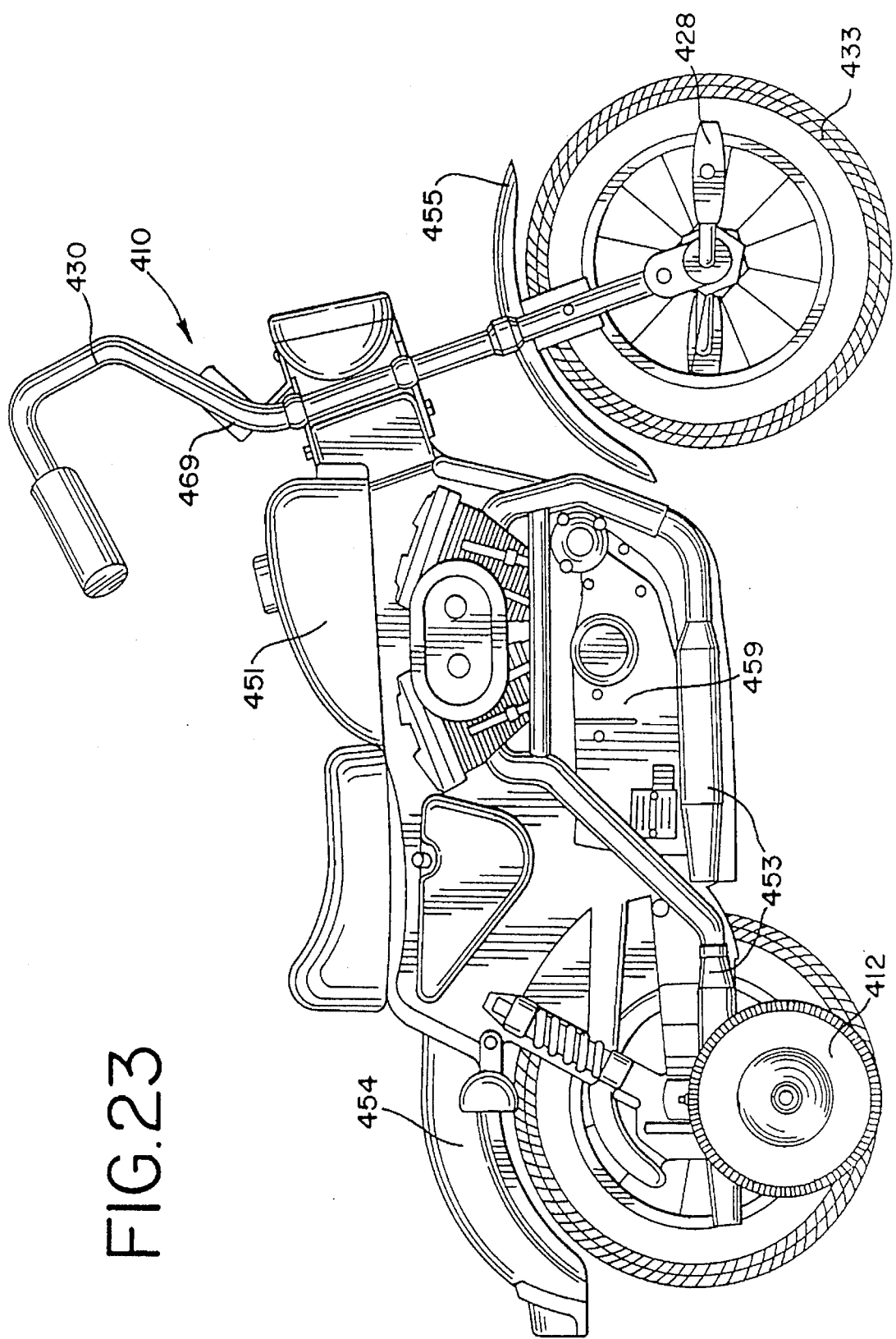
FIG. 23 is a right side elevational view of the bicycle of FIG. 22.
Figure 24:
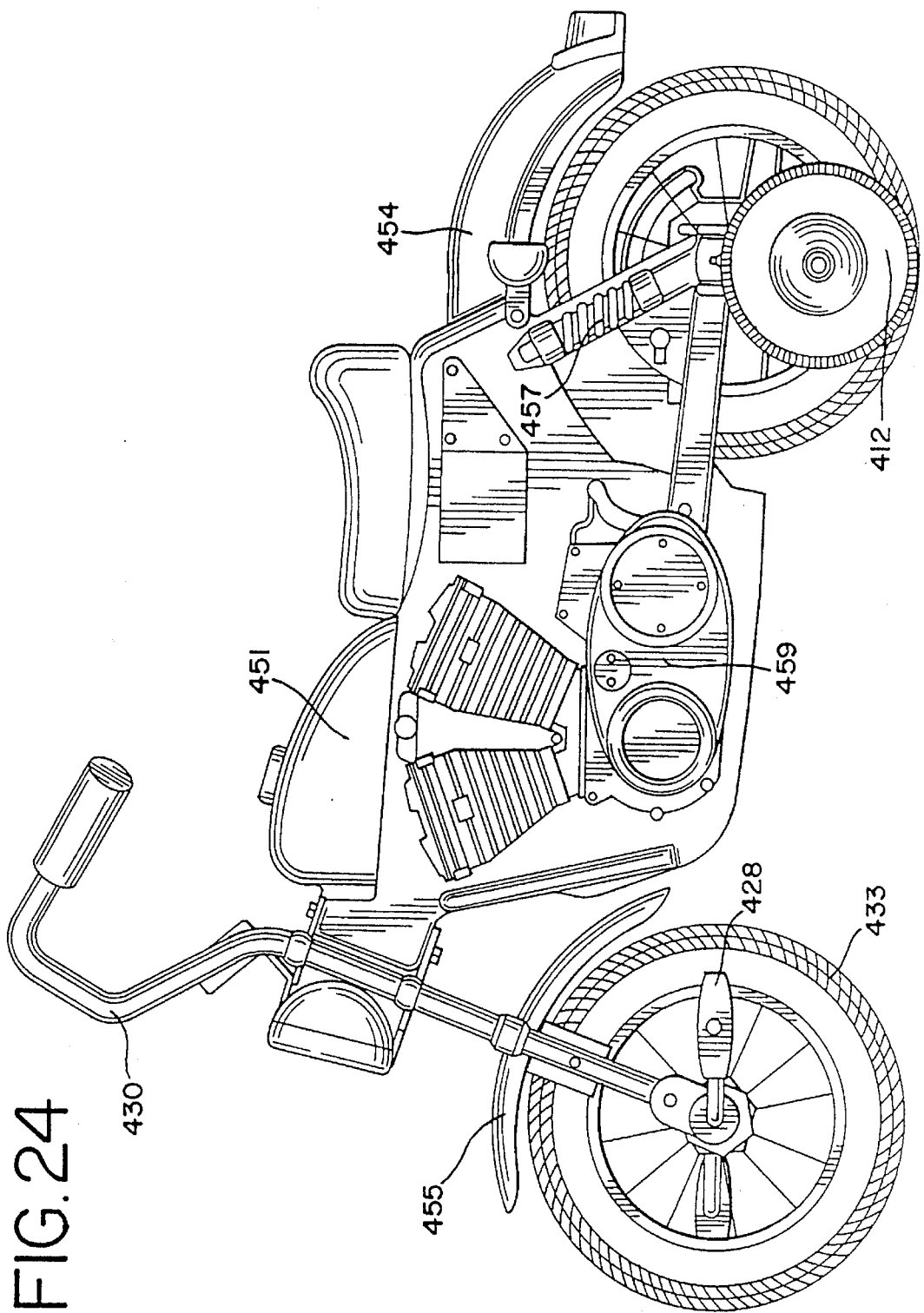
FIG. 24 is a left side elevational view of the bicycle of FIG. 22.
Figure 25:
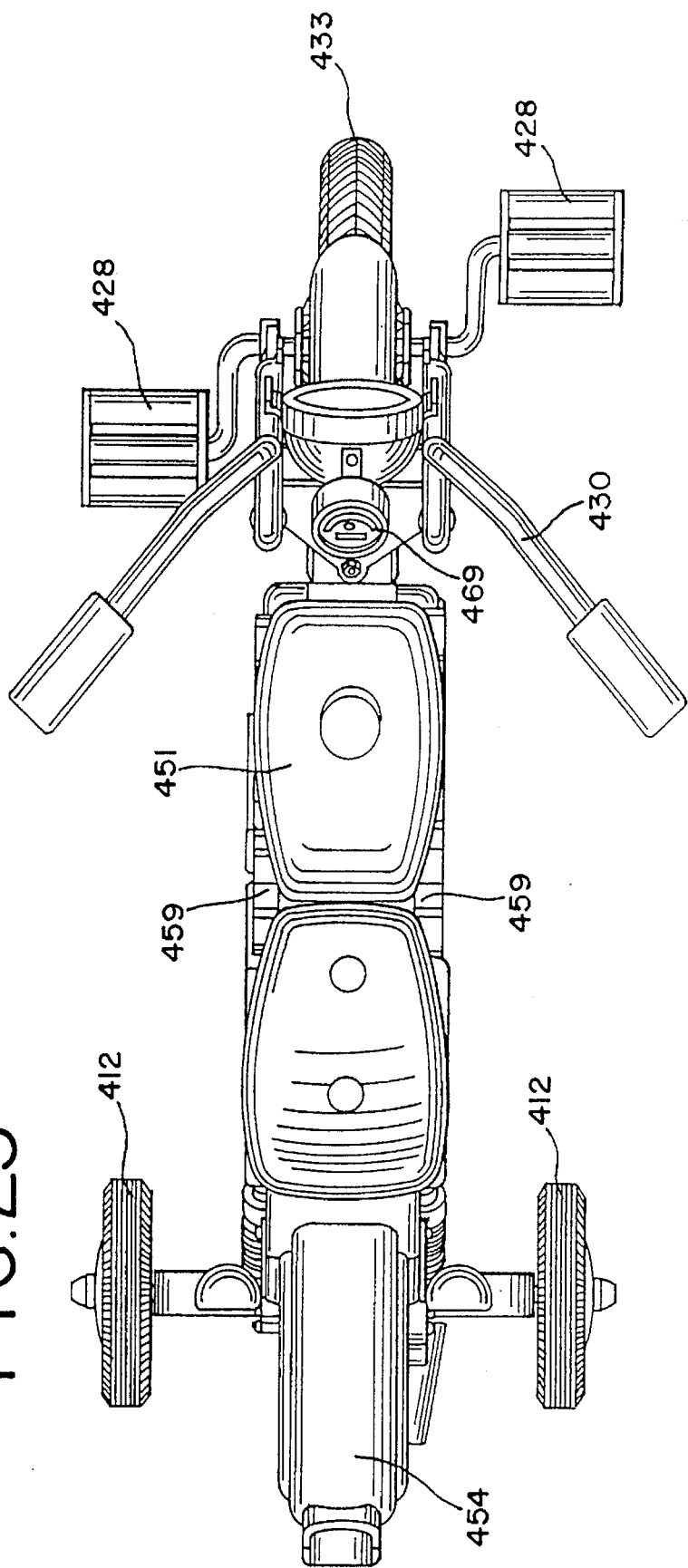
FIG. 25 is a top plan view of the bicycle of FIG. 22.
Figure 26:
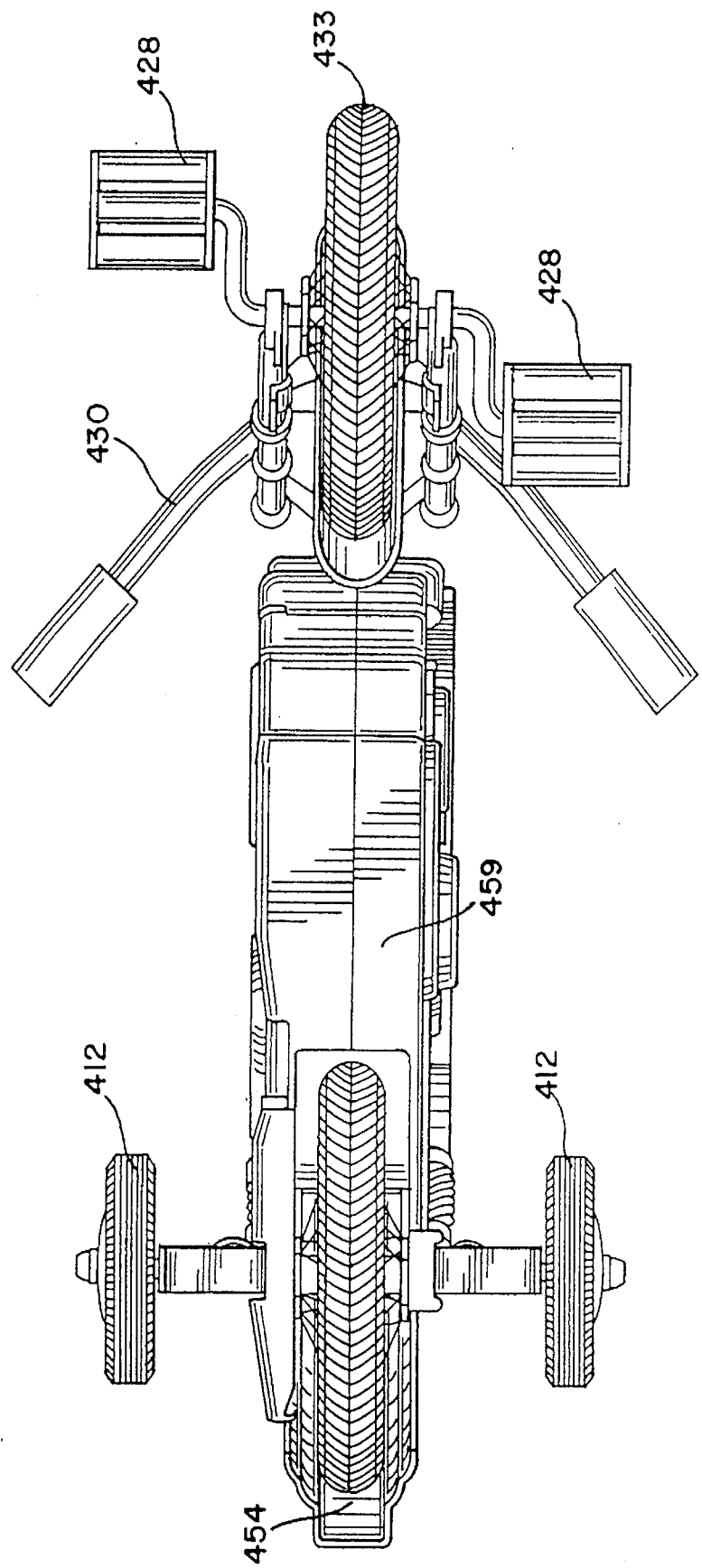
FIG. 26 is a bottom plan view of the bicycle of FIG. 22.
Figure 28:
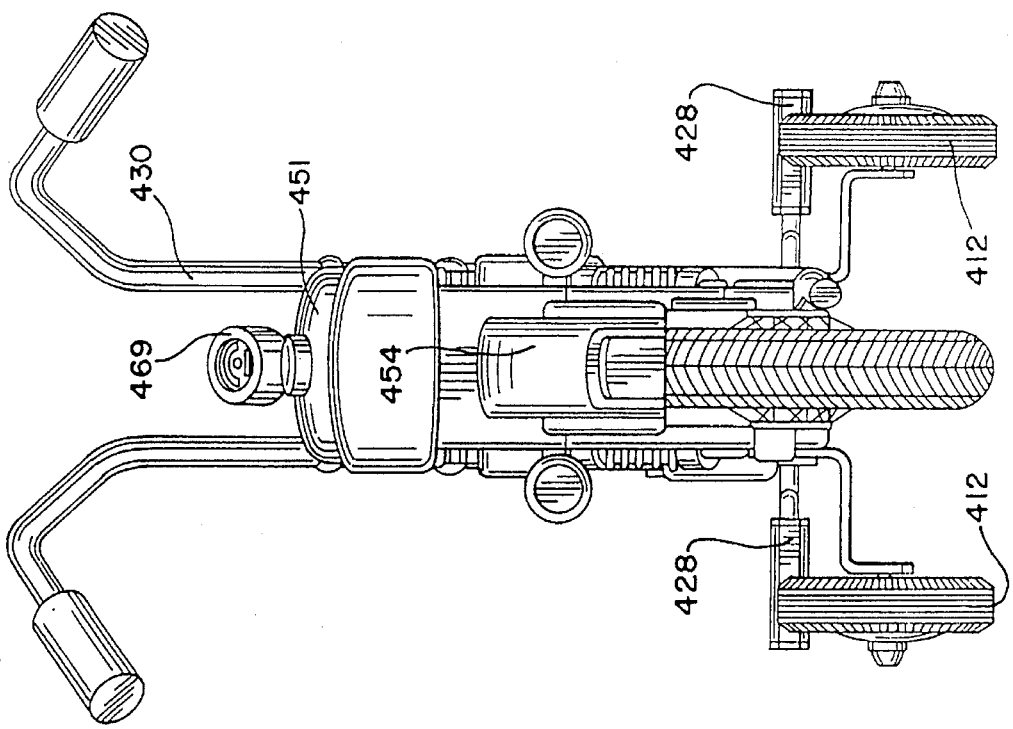
FIG. 28 is a rear elevational view of the bicycle of FIG. 22.
Figure 27:
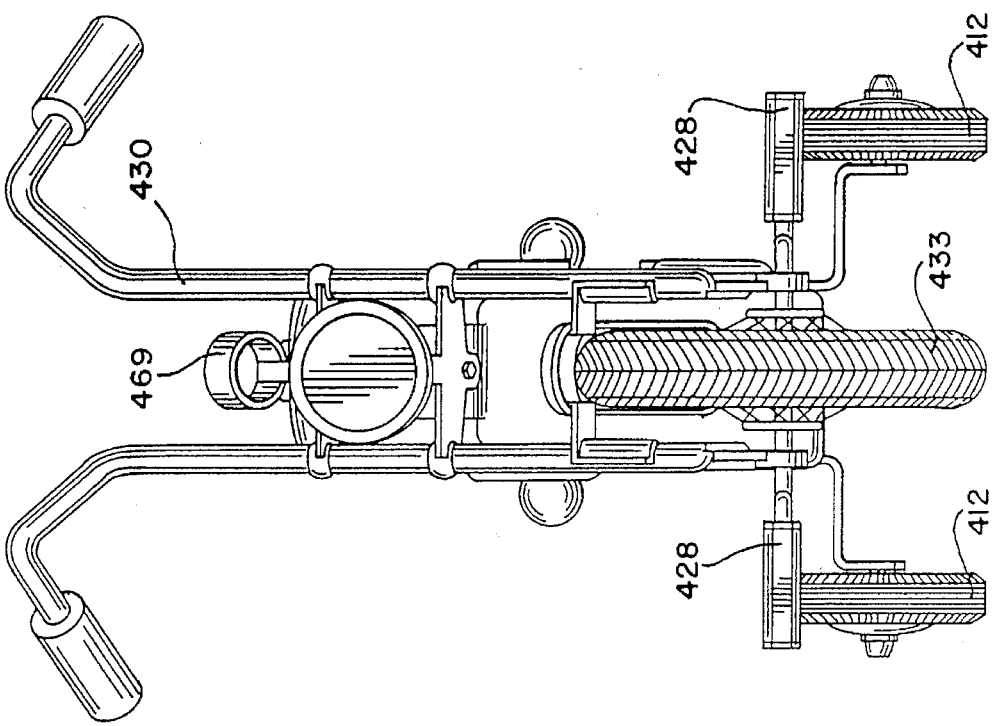
FIG. 27 is a front elevational view of the bicycle of FIG. 22.

One feature unique to the fourth embodiment, which is depicted in FIGS. 19–21, is a sound system. Mounted on the handlebars 330 next to the right hand brake lever 368 is a twist grip sound actuator 381. A start button 382 is mounted on the twist grip actuator 381. Wires 383 run from the twist grip, along top tube 324 and into a sound box 384 that is normally covered by the simulated oil filter cover 360. Four 1.5 volt AA batteries in the sound box 384 can be replaced by removing cover 385. The sound box is made of three pieces 386, 387 and 388 that allow it to be mounted around seat tube 326 (FIG. 19B).

The twist grip 381 is made of two major pieces, a stationary member 391 clamped to handlebar 330 and a rotatable member 392. Within the twist grip sound actuator 381 there are several electrical contacts, which are depicted in FIG. 20. When the twist grip 381 is in its normal position, the contacts are in an idle position, in which none of the three wiper members 394, 395 and 396 are in contact with their respective contacts 397, 398 and 399. As the rotatable member 392 rotates, wiper 394 comes in contact with contact 397 (position #1). Further rotation produces contact between wiper 395 and contact 398, while wiper 394 is still in contact with contact 397 (position #2). Further rotation puts all three wipers into contact with their respective contacts (position #3). Further rotation causes wiper 394 to lose contact with contact 397, while wipers 395 and 396 still contact their respective contacts (position #4). Further rotation results in only wiper 396 being in contact with its contact 399 (position #5). Further rotation, however, brings wiper 394 back into contact with a second portion of contact 397 while wiper 396 still contacts its contact 399 (position #6).

The contacts and start button 382 are electrically connected to a circuit board inside of sound box 384. The electrical schematic for that circuit board is shown in FIG. 21. Button 382 activates switch S1 and contacts 397, 398 and 399 in the twist grip sound actuator 381 are represented in the circuit board by switches S2, S3 and S4. The batteries provide power to power the circuit board and a speaker 393. Control functions are carried out by a Model ES3116 ROM chip 390 from ESS Company. The ROM chip 390 is programmed with digital sound reproductions of a starter motor, idle speed and six different engine speeds for a Harley-Davidson® motorcycle. Pushing the start button 382 activates the system and causes the speaker 393 to reproduce the sound of the starter for one second. Thereafter, the speaker 393 reproduces an idling engine sound. As the twist grip 381 is rotated in a counter-clockwise direction, the contacts go through positions 1–6, and the speaker reproduces the sound of an engine revving up through six different speeds. When the twist grip 381 is released, the chip 390 causes the speaker 393 to generate the idling engine sound again. After five seconds of idling with no further movement of the twist grip 381, the system shuts down until button 382 is pushed again.

Figure 29:
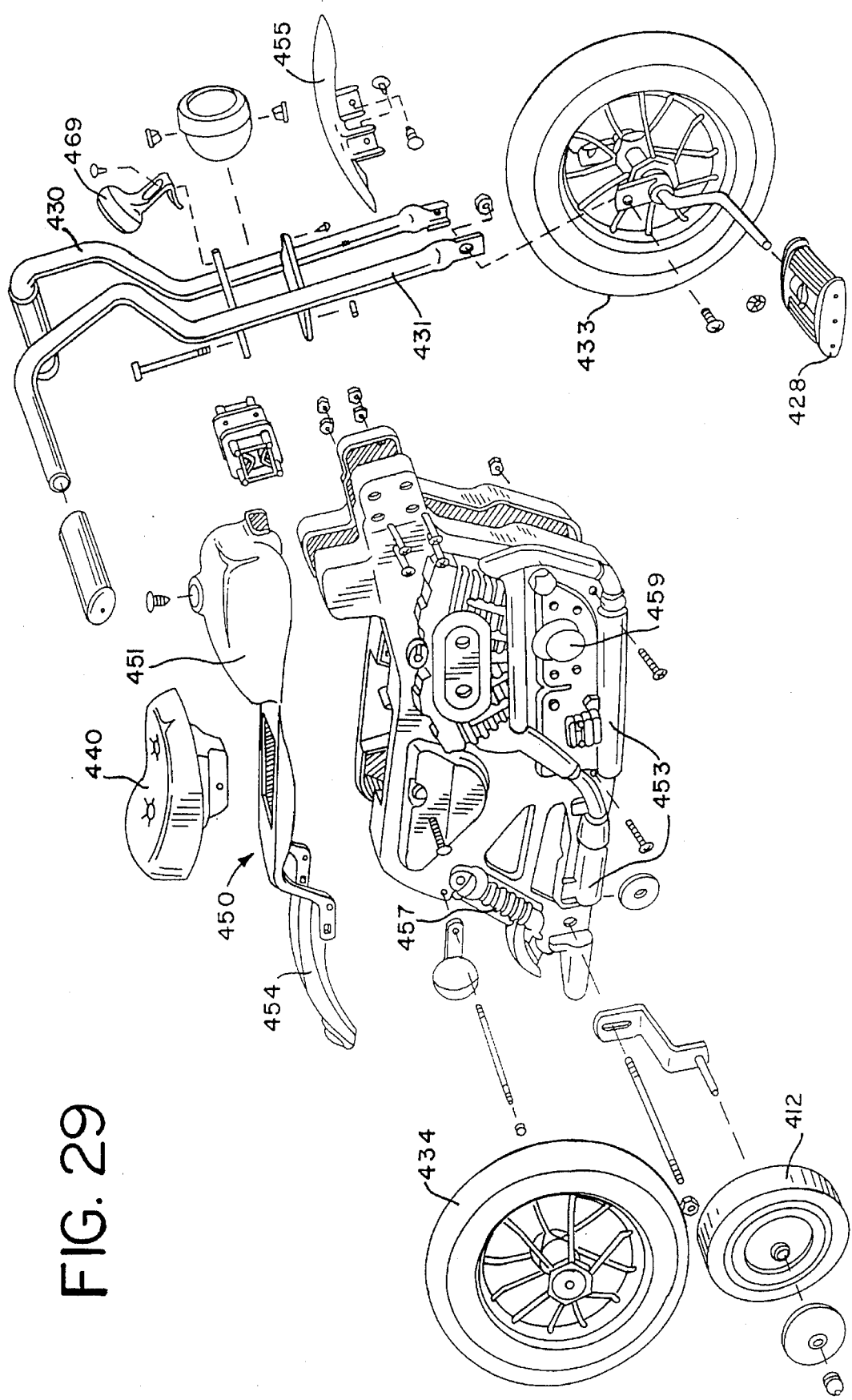
FIG. 29 is an exploded view of the bicycle of FIG. 22.

FIGS. 22–29 show a fifth embodiment of the invention. Like the fourth embodiment, the simulated motorcycle parts are intended to look like a Harley-Davidson® motorcycle. The bicycle 410 is a 10" bicycle, with training wheels 412. It is noted that on this bicycle, there is no chain. Instead, the pedals 428 are directly attached to the front wheel 433. Also, the bicycle 410 does not have an independent frame, but rather the rear wheel 434, seat 440 and front fork 431 attach to the simulated engine 459, as shown in FIG. 29.

The simulated engine 459 is made of two molded plastic members and includes a simulated exhaust system, including exhaust pipes 453, and shock absorbers 457 just as simulated engine 359. Also, the simulated engine 459 is preferably injection molded out of black plastic, though it may be chrome plated, while the front fender 455, gas tank 451 and rear fender portion 454 are molded of colored plastic. As with the fourth embodiment, body shell 450 has a front portion 451 simulating a gas tank and a rear fender portion 454. Also, the simulated gas tank 451 fits on top of a portion of the simulated engine 459.

On the 10" bike, the speedometer 469 is only simulated. A rear-view mirror (not shown) may optionally be attached to the handlebars 430 to further simulate a motorcycle.

As can be seen from the figures, the shrouds and other attachments produce a bicycle with a very realistic motorcycle simulation. This is partly due to the fact that the shroud or gas tank covers the top tube. Each of the shrouds and attachments are simple, and in the first four embodiments, the attachments and brackets can be removed to result in a conventional bicycle if the simulated motorcycle design is no longer wanted.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A combination of a bicycle and attachments attached to the bicycle to simulate a motorcycle,
   a) the bicycle comprising:
      i) a frame having a top tube and a seat tube and
      ii) a seat mounted on a seat post with one end secured within said seat tube;
   b) the attachments comprising:
      i) a shroud having a center portion, a rear fender portion extending over a rear wheel of the bicycle, and a front portion simulating a gas tank.

2. The combination of claim 1 wherein the simulated gas tank fits over a top portion of the top tube of the bicycle.

3. The combination of claim 1 wherein the attachments further comprise a simulated motorcycle engine.

4. The combination of claim 1 wherein the bicycle has a chain and the attachments further comprise a simulated exhaust system which serves as a chain guard.

5. The combination of claim 1 wherein the attachments further comprise a simulated shock absorber and spring assembly.

6. A bicycle having attachments to simulate a motorcycle,
   a) the bicycle comprising:
      (i) a frame including a head tube, a top tube, a down tube, a seat tube and seat and chain stays,
      (ii) crank pedals rotatably mounted on said frame,
      (iii) a front wheel mounted on a front fork pivotally mounted in said head tube,
      (iv) a rear wheel mounted on said seat and chain stays,
      (v) handlebars attached to said front fork for steering said bicycle, and
      (vi) a seat mounted to said seat tube; and
   b) the attachments comprising:
      (i) a simulated motorcycle gas tank mounted over the top tube,
      (ii) a rear fender extending over the rear wheel, and
      (iii) a front fender extending over the front wheel,
   wherein the simulated gas tank and rear fender comprise parts of a body shell.

7. The bicycle and attachments of claim 6 further comprising a turning limiter for limiting the degree of pivotability of the front fork.

8. The bicycle and attachments of claim 7 wherein the turning limiter comprises a hook attached to the head tube and a plate on the front fork in a position to contact said hook to limit the degree of pivotability of the front fork.

9. The bicycle and attachments of claim 6 wherein the gas tank and rear fender comprise parts of a monolithic body shell.

10. The bicycle and attachments of claim 6 further including a rear mounting bracket attached to the seat stay, the rear mounting bracket including side extensions which cooperate with the handlebars and the crank pedals such that the outward ends of the extensions, crank pedals and handlebars prevent contact of the simulated gas tank with the ground in the event the bicycle falls on its side.

11. The bicycle and attachments of claim 6 wherein the attachments are disconnectably secured to the bicycle so that they may be removed to result in a conventional bicycle.

12. The bicycle and attachments of claim 6 wherein the attachments comprise a simulated engine made of two molded plastic halves secured around the seat tube.

13. The bicycle and attachments of claim 6 wherein the attachments further simulates a battery box cover and oil filter cover.

14. The bicycle and attachments of claim 12 wherein the simulated motorcycle engine comprises chrome plated plastic.

15. The bicycle and attachments of claim 6 wherein the attachments comprise a simulated exhaust system that serves as a chain guard for the bicycle.

16. The bicycle and attachments of claim 10 wherein simulated turn signal lights are attached to the side extensions.

17. A bicycle with a plastic body shell to simulate a motorcycle; the bicycle comprising a frame, a front wheel, a rear wheel, handlebars and pedals mounted on said frame, and frame extensions extending from the bicycle from each side thereof; the body shell comprising a rear fender portion extending over the rear wheel and having a hole through the body shell on each side thereof; the extensions being located behind the pedals and above the axle of the rear wheel and extending through said holes in said body shell, and sufficiently long compared to the width of the plastic body shell such that the extremities of the handlebars, pedals and frame extension on each side of the bicycle define a plane which does not intersect the body shell.

18. The bicycle of claim 17 further comprising a turning limiter to limit the pivotability of the handlebars with respect to the frame.

19. A bicycle with attachments to simulate a motorcycle,
   a) the bicycle comprising:
      (i) a frame, including a head tube, seat tube and down tube,
      (ii) front and rear wheels rotatable mounted to said frame, and
      (iii) a bicycle seat with an adjustable height mounted on the seat tube; and
   b) the attachments comprising:
      (i) a shroud having a simulated gas tank and rear fender portion, the shroud having a central portion with a hole therethrough through which the seat tube passes.

20. The bicycle and attachments of claim 19 further comprising a simulated engine separate from the shroud and attached to the frame.

21. The bicycle and attachments of claim 19 further comprising a rotatable hand grip electrically connected to a sound box such that rotation of the hand grip causes motorcycle engine sounds to be reproduced by said sound box.

22. A bicycle with a front fork, a front and rear wheel, handlebars and a seat and simulating a motorcycle comprising:
   a) a molded plastic simulated motorcycle engine comprising a simulated exhaust system and shock absorber;
   b) a body shell that includes a simulated gas tank that fits on top of a portion of the simulated engine and a rear fender portion that extends over the rear wheel.

23. The bicycle of claim 22 wherein the bicycle has a frame to which the wheels, body shell and simulated engine attach.

24. The bicycle of claim 22 wherein the front fork, seat and rear wheel attach to the simulated engine.

25. The bicycle of claim 22 wherein the simulated engine is formed of two plastic engine halves attached together.

26. The combination of claim 1 further comprising frame extentions extending from the bicycle frame on each side thereof and wherein the shroud comprises two holes on opposing sides thereof and the extensions extend through said holes in the shroud.

27. A combination of a bicycle and attachments attached to the bicycle to simulate a motorcycle,
 a) the bicycle comprising:
  i) a frame;
 b) the attachments comprising:
  i) a shroud mounted on the frame so as to at least partially cover the frame to thereby simulate a motorcycle, and having two holes, one on each of opposing sides of the shroud, and
  ii) frame extensions extending from the bicycle frame on each side thereof and through the holes in the shroud.

* * * * *